(12) United States Patent
Teraoka et al.

(10) Patent No.: US 11,437,195 B2
(45) Date of Patent: Sep. 6, 2022

(54) MULTILAYER CERAMIC ELECTRONIC COMPONENT AND MANUFACTURING METHOD THEREFOR

(71) Applicant: TAIYO YUDEN CO., LTD., Tokyo (JP)

(72) Inventors: Hideya Teraoka, Tokyo (JP); Atsushi Imai, Tokyo (JP)

(73) Assignee: TAIYO YUDENCO., LTD., Tokyo (JP)

( * ) Notice: Subject to any disclaimer, the term of this patent is extended or adjusted under 35 U.S.C. 154(b) by 2 days.

(21) Appl. No.: 17/030,790

(22) Filed: Sep. 24, 2020

(65) Prior Publication Data

US 2021/0098194 A1 Apr. 1, 2021

(30) Foreign Application Priority Data

Sep. 26, 2019 (JP) .............................. JP2019-175235

(51) Int. Cl.
| | |
|---|---|
| *H01G 4/30* | (2006.01) |
| *H01G 4/12* | (2006.01) |
| *H01G 4/012* | (2006.01) |
| *H01G 4/228* | (2006.01) |

(52) U.S. Cl.
CPC .............. *H01G 4/30* (2013.01); *H01G 4/012* (2013.01); *H01G 4/1227* (2013.01); *H01G 4/228* (2013.01)

(58) Field of Classification Search
CPC ............ H01G 4/30; H01G 4/12; H01G 4/012; H01G 4/228; H01G 4/1227

USPC ............... 361/301.4, 321.1, 311, 321.5, 320; 29/25.41
See application file for complete search history.

(56) References Cited

U.S. PATENT DOCUMENTS

| | | | | |
|---|---|---|---|---|
| 2012/0250220 | A1* | 10/2012 | Yamashita | ............. H01G 4/232 361/321.2 |
| 2018/0301282 | A1* | 10/2018 | Nishikawa | ............. H01G 4/005 |
| 2019/0252120 | A1* | 8/2019 | Sakate | ...................... H01G 4/12 |

FOREIGN PATENT DOCUMENTS

| | | | |
|---|---|---|---|
| JP | 2015029158 A | * | 2/2015 |
| JP | 2017-11172 A | | 1/2017 |

* cited by examiner

*Primary Examiner* — Arun Ramaswamy
(74) *Attorney, Agent, or Firm* — Chen Yoshimura LLP

(57) ABSTRACT

A multilayer ceramic electronic component includes a ceramic main body including a functional part in which first internal electrodes and second internal electrodes are laminated in a vertical direction, end margin parts provided respectively between a first end surface of the ceramic main body and the second internal electrodes and between a second end surface of the ceramic main body and the first internal electrodes, and side margin parts that respectively cover the functional part from sides. The electronic component further includes external electrodes respectively provided on the first end surface and the second end surface. The end margin parts contain boron (B), and the side margin parts contain silicon (Si) and boron. A concentration of boron in the side margin parts is less than a concentration of boron in the end margin parts.

5 Claims, 20 Drawing Sheets

MULTILAYER CERAMIC ELECTRONIC COMPONENT AND MANUFACTURING METHOD THEREFOR

BACKGROUND OF THE INVENTION

Technical Field

The present disclosure relates to multilayer ceramic electronic components and methods for manufacturing the same.

Background Art

A typical multilayer ceramic electronic component is a multilayer ceramic capacitor. In recent years, with the miniaturization and high performance of electronic devices, there has been an increasing demand for miniaturization and large capacitance of multilayer ceramic capacitors.

A multilayer ceramic capacitor typically has a functional part (capacitance forming part) in which internal electrodes and ceramic layers are alternately laminated, margin parts made of a ceramic material around the functional part, and external electrodes connected to the internal electrode. The margin parts includes, for example, end margin parts formed between the internal electrodes and the external electrodes, respectively, and side margin parts that cover the side end portions of the internal electrodes, respectively.

Since these margin parts are made of a ceramic material, they exhibit different sintering behavior from the internal electrodes made of metal. Specifically, the margin parts have a higher sintering temperature than metal, and the progress of sintering is slow. Therefore, during firing, stress due to the difference in sintering behavior is applied between the functional part having the internal electrodes and the margin parts, and structural defects such as cracks are likely to occur.

Therefore, in order to improve the sinterability of the margin parts, an attempt has been made to add a sintering aid to the margin parts. For example, Patent Document 1 describes a multilayer ceramic capacitor in which the dielectrics contain a larger amount of a sintering aid such as manganese and magnesium than internal dielectrics laminated with first internal electrode layers and second internal electrode layers.

RELATED ART DOCUMENT

Patent Document

Patent Document 1: Japanese Patent Application Laid-Open Publication No. 2017-11172

SUMMARY OF THE INVENTION

On the other hand, different sinterability is required for the end margin parts and the side margin parts. That is, for the end margin parts covered with the external electrodes, there is a demand that the sintering behavior should be as close as possible to the metal sintering behavior from the viewpoint of ensuring the connection between the internal electrodes and the external electrodes. In contrast, for the side margin parts, although it is desired to approach the sintering behavior of the metal from the viewpoint of stress relaxation with the functional part, the side margin parts have a high degree of exposure to the firing atmosphere and are easily oversintered. When the side margin part is oversintered, the insulating property is deteriorated due to the spheroidization/fragmentation of the internal electrodes. For this reason, there is a demand for improving the sinterability of the side margin parts while suppressing oversintering.

In view of the above circumstances, an object of the present disclosure is to provide a multilayer ceramic electronic component capable of suppressing poor connection between internal electrodes and external electrodes while suppressing poor insulation, and a method for manufacturing the same.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a multilayer ceramic electronic component, comprising: a ceramic main body having a first end surface and a second end surface respectively facing in a first direction and in a direction opposite to the first direction, the ceramic main body including: a functional part in which first internal electrodes, which are drawn out to the first end surface, and second internal electrodes, which are drawn out to the second end surface, are laminated in a second direction perpendicular to the first direction with ceramic layers interposed therebetween; end margin parts provided respectively between the first end surface and the second internal electrodes and between the second end surface and the first internal electrodes; and side margin parts that respectively cover the functional part from a third direction perpendicular to the first and second directions and from a direction opposite to the third direction; and external electrodes respectively provided on the first end surface and the second end surface, wherein the end margin parts contain boron (B), and wherein the side margin parts contain silicon (Si) and boron, a concentration of boron in the side margin parts being less than a concentration of boron in the end margin parts.

Since the end margin parts contain a high concentration of boron, which has a high effect of enhancing the sinterability, the sintering behavior of the end margin parts becomes closer to the sintering behavior of the external electrodes and the internal electrodes, which are metals. As a result, the end margin parts shrink in a manner similar to the shrinkage of the external electrodes and the internal electrodes during firing. Therefore, it is possible to suppress poor connection between the external electrodes and the internal electrodes.

On the other hand, the side margin parts have a high degree of exposure to the firing atmosphere, and oversintering is likely to occur due to boron. For this reason, by making the boron concentration in the side margin parts lower than that in the end margin parts, abnormal grain growth of ceramic grains due to oversintering is suppressed, and short circuits due to spheroidization/fragmentation of the internal electrodes and deterioration of insulation properties are prevented. At the same time, by gently increasing the sinterability of the side margin parts with silicon, it is possible to suppress stress caused by a difference in sintering behavior between the side margin parts and the functional part having internal electrodes. Therefore, it is possible to suppress structural defects such as cracks between the side margin parts and the functional part, and to suppress insulation failure caused by the defects.

Here, the end margin parts may contain silicon (Si) such that the side margin parts may have a higher concentration of silicon than the end margin parts.

In such a case, since the side margin parts have a higher concentration of silicon, the sinterability of the side margin parts can be controlled by the silicon. Therefore, while suppressing oversintering in the side margin parts, it is possible to suppress stress caused by a difference in sintering behavior between the side margin parts and the functional part having the internal electrodes. Therefore, structural defects such as cracks between the side margin parts and the functional part can be more reliably suppressed, and insulation defects caused by the cracks can be suppressed.

Further, the end margin parts may include, as a main component, a ceramic material having a perovskite structure represented by the general formula $ABO_3$ as a main phase.

When the concentration of the element at the B site of the ceramic material in the end margin part is set to 100 atm %, the boron concentration in the end margin part may be 0.015 atm % or more and 0.025 atm % or less.

The boron concentration in the side margin parts may be 70% or less of the boron concentration in the end margin parts.

Further, the positions of lateral ends of the first internal electrodes and the second internal electrodes in the third direction may be aligned with each other within 0.5 μm in the third direction.

In another aspect, the present disclosure provides a method for manufacturing a multilayer ceramic electronic component, comprising: forming an unfired ceramic main body having a first end surface and a second end surface respectively facing in a first direction and in a direction opposite to the first direction, the ceramic main body including: a functional part in which first internal electrodes, which are drawn out to the first end surface, and second internal electrodes, which are drawn out to the second end surface, are laminated in a second direction perpendicular to the first direction with ceramic layers interposed therebetween; end margin parts provided respectively between the first end surface and the second internal electrodes and between the second end surface and the first internal electrodes; and side margin parts that cover the functional part from a third direction perpendicular to the first and second directions and from a direction opposite to the third direction, the end margin parts containing boron (B), and the side margin parts containing silicon (Si) and boron, a concentration of boron in the side margin parts being less than a concentration of boron in the end margin parts; forming unfired external electrodes respectively on the end surfaces of the unfired ceramic body; and firing the unfired ceramic body having the unfired external electrodes formed thereon.

As described above, according to the present disclosure, it is possible to provide a multilayer ceramic electronic component capable of suppressing poor connection between the internal electrodes and external electrodes and suppressing poor insulation, and to provide a method for manufacturing the same.

It is to be understood that both the foregoing general description and the following detailed description are exemplary and explanatory, and are intended to provide further explanation of the invention as claimed.

DETAILED DESCRIPTION OF EMBODIMENTS

Hereinafter, embodiments of the present disclosure will be described with reference to the drawings.

The drawings show the X-axis, Y-axis, and Z-axis that are orthogonal to each other as appropriate. The X-axis, Y-axis, and Z-axis are common to all drawings.

I. First Embodiment

1. Configuration of Multilayer Ceramic Capacitor 10

Figure 1:
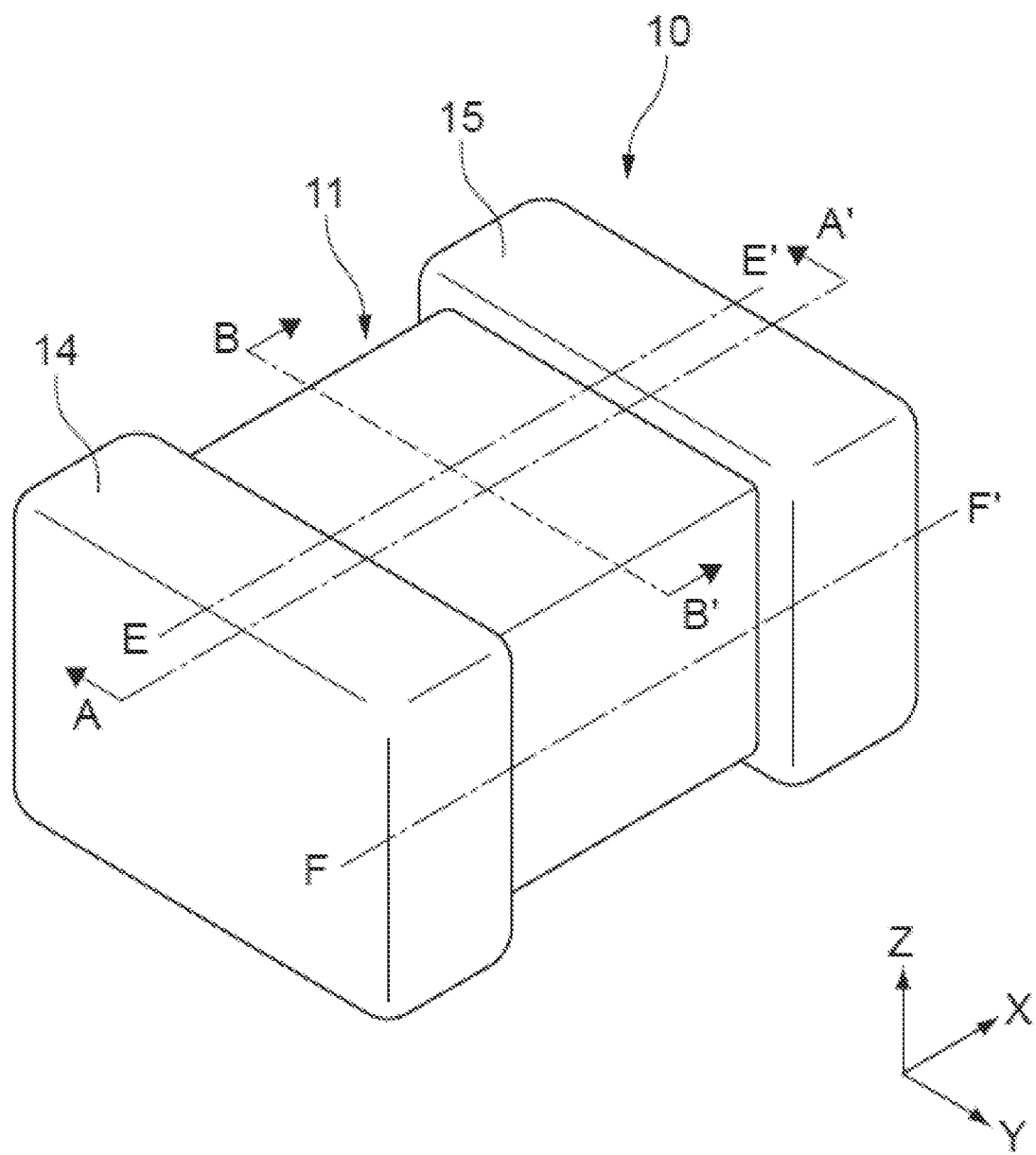
FIG. 1 is a perspective view of a multilayer ceramic capacitor according to a first embodiment of this disclosure.
Figure 2:
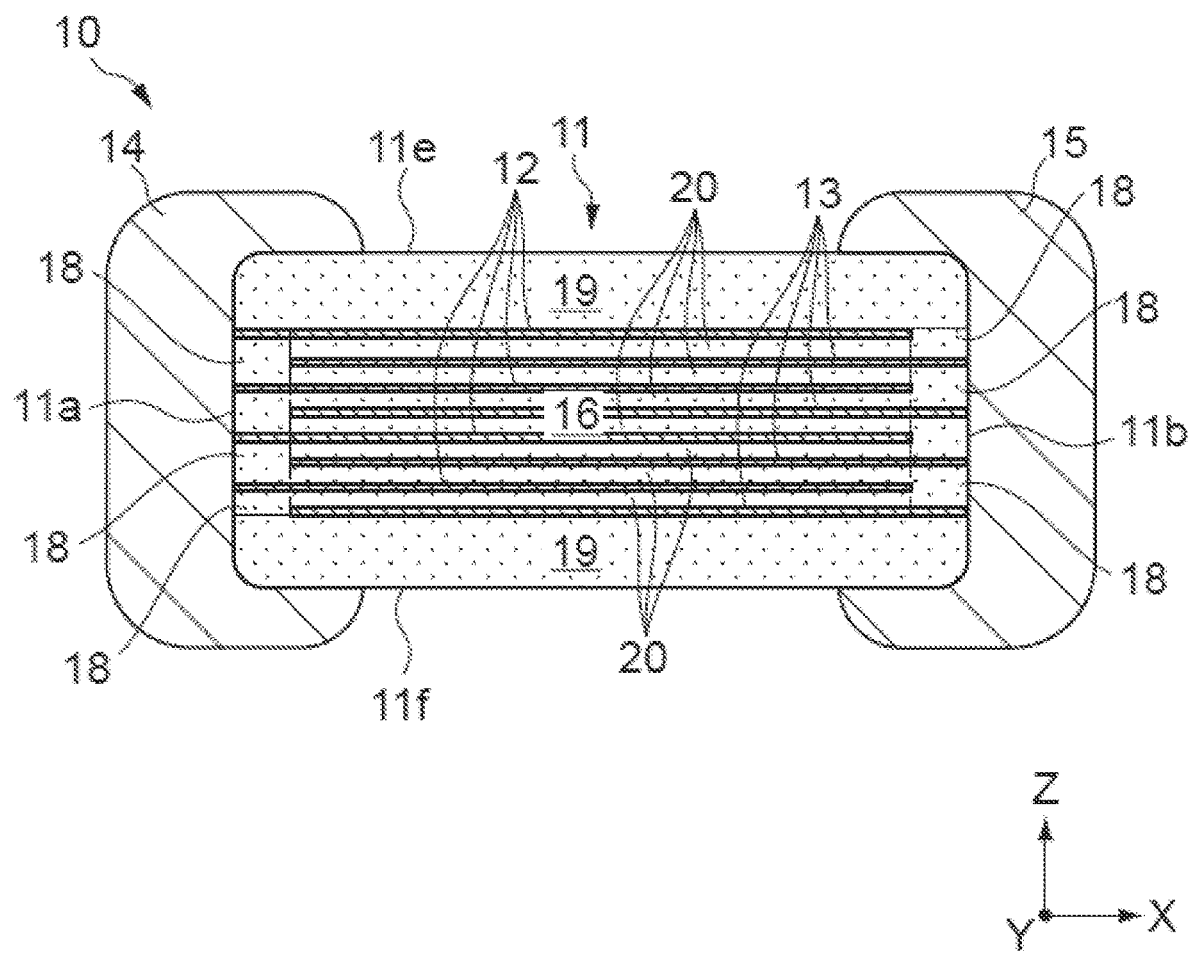
FIG. 2 is a cross-sectional view taken along the A-A' line of FIG. 1 of the multilayer ceramic capacitor.
Figure 3:
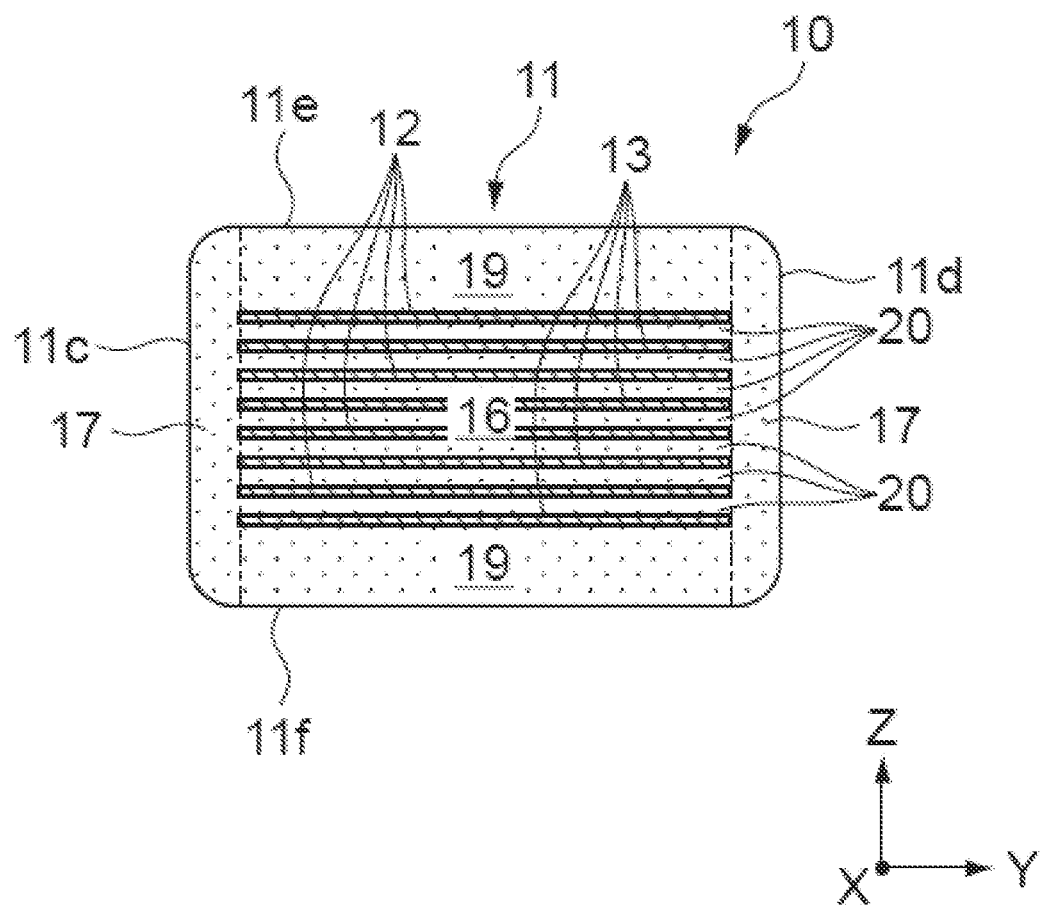
FIG. 3 is cross-sectional view taken along the line B-B' of FIG. 1 of the multilayer ceramic capacitor.

FIGS. 1-3 show a multilayer ceramic capacitor 10 according to a first embodiment of the present disclosure. FIG. 1 is a perspective view of the multilayer ceramic capacitor 10. FIG. 2 is a cross-sectional view of the multilayer ceramic capacitor 10 taken along the line A-A' of FIG. 1. FIG. 3 is a cross-sectional view of the multilayer ceramic capacitor 10 taken along the line B-B' of FIG. 1.

The multilayer ceramic capacitor 10 includes a ceramic main body 11, first external electrodes 14, and second external electrodes 15. The ceramic main body 11 has a first end surface 11a and a second end surface 11b respectively facing in the negative and positive the X-directions, a first side surface 11c and a second side surface 11d respectively facing in the negative and positive Y-directions, and a first main surface 11e and a second main surface 11f respectively facing in the positive and negative Z-directions. Here, ridge portions connecting adjacent surfaces of the ceramic main body 11 may be rounded.

The first external electrode 14 is provided on the first end surface 11a. The second external electrode 15 is provided on the second end surface 11b. The first external electrode 14 extends from the first end surface 11a of the ceramic main body 11 to both main surfaces 11e and 11f and both side surfaces 11c and 11d. Similarly, the second external electrode 15 extends from the second end surface 11b of the ceramic main body 11 to both main surfaces 11e and 11f and both side surfaces 11c and 11d. As a result, in the external electrodes 14 and 15, the cross section parallel to the X-Z plane and the cross section parallel to the X-Y plane are both U-shaped. The shapes of the external electrodes 14 and 15 are not limited to those shown in FIG. 1, however.

The external electrodes 14 and 15 are formed of a good electrical conductor. Examples of such a good electrical conductor forming the external electrodes 14 and 15 include a metal or an alloy having copper (Cu), nickel (Ni), tin (Sn), palladium (Pd), platinum (Pt), silver (Ag) or gold (Au) as its main component.

The ceramic main body 11 has a capacitance forming part 16, side margin parts 17, end margin parts 18, and cover parts 19. The capacitance forming part 16 is configured as a functional part in the present embodiment.

The capacitance forming part 16 has first internal electrodes 12 and second internal electrodes 13 that are alternately laminated in the Z-direction with a plurality of ceramic layers 20 interposed therebetween. The internal electrodes 12 and 13 are formed of a good electrical conductor. Such a good electrical conductor forming the internal electrodes 12 and 13 is typically nickel (Ni), and may also be a metal or an alloy having copper (Cu), palladium (Pd), platinum (Pt), silver (Ag), gold (Au) or the like as its main components.

The internal electrodes 12 and 13 are each formed in a sheet shape extending along the X-Y plane. Each first internal electrode 12 is drawn out to the first end surface 11a and is connected to the first external electrode 14. Each second internal electrode 13 is drawn out to the second end surface 11b and connected to the second external electrode 15. As a result, when a voltage is applied between the first external electrode 14 and the second external electrode 15, that voltage is applied to the ceramic layers 20 between the first internal electrodes 12 and the second internal electrodes 13, and the capacitance forming part 16 stores charges corresponding to the voltage.

In the ceramic main body 11, dielectric ceramics having a high dielectric constant are used in order to increase the capacitance of each ceramic layer 20 between the internal electrodes 12 and 13. Examples of the dielectric ceramics having a high dielectric constant include materials having a perovskite structure containing barium (Ba) and titanium (Ti) represented by barium titanate ($BaTiO_3$).

For the material of the ceramic layer 20 may strontium titanate ($SrTIO_3$) system, calcium titanate ($CaTiO_3$) system, magnesium titanate ($MgTiO_3$) system, calcium zirconate ($CaZrO_3$) system, and calcium zirconate titanate ($Ca(Zr,Ti)O_3$) system, barium zirconate ($BaZrO_3$) system, titanium oxide ($TiO_2$) system and the like may be used.

Further, the ceramic layer 20 may contain boron (B) as a subcomponent in addition to the above-mentioned main component. Further, the ceramic layer 20 may include silicon (Si), vanadium (V), manganese (Mn), magnesium (Mg), lithium (Li), sodium (Na), potassium (K), and rare earth elements (yttrium (Y)), europium (Eu), gadolinium (Gd), terbium (Tb), dysprosium (Dy), holmium (Ho), erbium (Er), ytterbium (Yb), etc.). But the subcomponent is not limited thereto.

The end margin parts 18 are provided between the capacitance forming part 16 and the external electrodes 14 and 15, respectively. Specifically, the end margin parts 18 are provided respectively between the first end surface 11a and the second internal electrodes 13 and between the second end surface 11b and the first internal electrodes 12. The end margin parts 18 are formed of an insulating ceramic to ensure insulation between the first internal electrodes 12 and the second external electrode 15 and insulation between the second internal electrodes 13 and the first external electrode 14.

The cover parts 19 are provided on both sides of the capacitance forming part 16 in the Z-direction. The cover part 19 is made of an insulating ceramic to ensure insulation of the capacitance forming part 16 in the Z-direction and protect the capacitance forming part 16. In the present embodiment, the capacitance forming part 16, the end margin parts 18, and the cover parts 19 are configured as a substantially rectangular parallelepiped laminated body.

The side margin parts 17 cover the capacitance forming part 16 from the positive and negative Y-directions. The side margin parts 17 are formed of an insulating ceramic to ensure insulation of the capacitance forming part 16 along the Y-direction and protect the capacitance forming part 16. The side margin parts 17 of the present embodiment are configured to cover the Y-direction side surfaces of the laminated body including the capacitance forming part 16, the end margin parts 18, and the cover parts 19. In this case, the positions of the lateral ends of the internal electrodes 12 and 13 along the Y-axis are aligned with each other within a range of 0.5 μm along the Y-axis. That is, of the Y-direction lateral ends of the first internal electrode 12 and the second internal electrode 13, the lateral end located on the outermost side along the Y-axis and the lateral end located on the innermost side along the Y-axis are separated along the Y-axis within 0.5 μm at each side surface.

The insulating ceramics used in the end margin parts 18, the cover parts 19, and the side margin parts 17 may include the dielectric ceramic used in the ceramic layers 20. In more detail, the side margin parts 17 and the end margin parts 18 have the below-described composition.

2. Composition of Side Margin Parts 17 and End Margin Parts 18

The side margin parts 17 and the end margin parts 18 contain, as a main component, a ceramic material having a perovskite structure represented by the general formula $ABO_3$ as a main phase, for example. Examples of such a ceramic material include the above-mentioned barium titanate, but in addition, strontium titanate, calcium titanate, magnesium titanate, calcium zirconate, calcium zirconate titanate, barium zirconate, or the like can be used.

Further, the end margin parts 18 contain boron as a subcomponent. Boron functions as a sintering aid that enhances the sinterability of ceramics, as will be described later. Specifically, the boron concentration of the end margin parts 18 is 0.015 atm % or more and 0.025 atm % or less when the concentration of the element at the B site of the ceramic material (main component) of the end margin parts 18 is set to 100 atm %. When the main component of the ceramic material of the end margin parts 18 is barium titanate ($BaTiO_3$), the element at the B site is titanium (Ti).

The side margin parts 17 contain a lower concentration of boron than the end margin parts 18. The boron concentration of the side margin parts 17 may be 70% or less of the boron concentration of the end margin parts 18.

Boron has the effect of lowering the sintering temperature of ceramic materials even in small amounts. In general, ceramic materials have a higher sintering temperature than metal materials. Therefore, a metal material having a low sintering temperature starts shrinking at a lower temperature than a ceramic material at the time of firing. If the internal electrodes 12 and 13 and the external electrodes 14 and 15 shrink relative to the end margin parts 18, they may be separated from each other on the end surfaces 11a and 11b, and the internal electrodes 12 and 13 may not be adequately connected to the external electrodes 14 and 15.

By adding a relatively high concentration of boron to the end margin parts 18, the sintering temperature of the end margin parts 18 can be brought close to the sintering temperature of the external electrodes 14, 15 and the internal electrodes 12, 13. That is, at the time of firing, the end margin parts 18 shrink in a manner similar to the shrinkage of the external electrodes 14, 15 and the internal electrodes 12, 13. As a result, it is possible to prevent the external electrodes 14 and 15 and the internal electrodes 12 and 13 from being separated from each other on the end surfaces 11a and 11b. Therefore, the connection between the first internal electrodes 12 and the first external electrode 14 and the connection between the second internal electrodes 13 and the second external electrode 15 can be secured, and poor connection of the external electrodes 14 and 15 can be suppressed.

Further, by suppressing the boron concentration of the side margin parts 17, it is possible to suppress the abnormal grain growth of the ceramic grains due to the oversintering of the side margin parts 17, which have a high degree of exposure to the firing atmosphere. When the ceramic grains of the side margin parts 17 grow abnormally, the fine structure of the internal electrodes 12 and 13 near the side margin parts 17 is destroyed, and the corresponding edges are likely to be spheroidized and fragmented. As a result, the corresponding edges of the adjacent internal electrodes 12 and 13 may approach or come into contact with each other, resulting in poor insulation such as a short circuit. Therefore, by suppressing the oversintering of the side margin parts 17, it is possible to prevent the insulation failure of the internal electrodes 12 and 13.

Further, the side margin parts 17 contain silicon. Silicon also functions as a sintering aid, but silicon has a milder effect of enhancing sinterability than boron. Therefore, since the side margin parts 17 contain silicon in addition to the low concentration of boron, it is possible to improve the sinterability while suppressing oversintering. By enhancing the sinterability of the side margin parts 17, stress caused by the difference in sintering behavior between the capacitance forming part 16 and the side margin parts 17 is alleviated in the sintering process. Therefore, structural defects such as cracks between the capacitance forming part 16 and the side margin parts 17 are prevented, and insulation defects associated therewith are also suppressed.

In the present embodiment, the end margin parts 18 also contain silicon, but the side margin parts 17 may contain a higher concentration of silicon than the end margin parts 18. The silicon concentration of the side margin parts 17 may be, for example, 2.0 atm % or more when the concentration of the element at the B site of the ceramic material (main component) of the side margin part 17 is set to 100 atm %. When the main component of the ceramic material of the side margin parts 17 is barium titanate ($BaTiO_3$), the element at B site is titanium (Ti).

The concentration of each element in the end margin portions 18 can be evaluated by analyzing the concentration of each element in the end margin portions 18 in the cross section taken along the line A-A' in FIG. Similarly, the concentration of each element of the side margin portions 17 can be evaluated by analyzing the concentration of each element of the side margin portions 17 in the cross section taken along the line B-B' of FIG. The cross section taken along the line A-A' is a cross section that divides the multilayer ceramic capacitor 10 into approximately two equal parts in the Y-direction, passes through the substantially central portion of the first main surface 11e in the Y-direction, and is substantially parallel to the Z-direction and the X-direction. The cross section taken along the line B-B' is a cross section that divides the multilayer ceramic capacitor 10 into approximately two equal parts in the X-direction, passes through the substantially central portion of the second side surface 11d in the X-direction, and is substantially parallel to the Z-direction and the Y-direction. The concentration of each element can be evaluated by performing analysis at three points in each of the side margin portions 17 and the end margin portions 18 and calculating the average value thereof.

Instead of the above-mentioned cross sections, the concentration of each element in the end margin portions 18 and the side margin portions 17 can also be analyzed by using a single cross section passing through the E-E' line and the F-F line of FIG. 1. The E-E' line in FIG. 1 is a line extending in the X-direction through the substantially central portion of the main surface 11e in the Y-direction, and the F-F' line is a line extending in the X-direction through the substantially central portion of the side surface 11d in the Z-direction. In this single cross section passing through the E-E' line and the F-F line in FIG. 1, the side margin portions 17 and the end margin portions 18 of the multilayer ceramic capacitor 10 appear on the same surface. By analyzing such a cross section, it is possible to easily compare the element concentrations in the side margin portions and the end margin portions.

3. Manufacturing Method of Multilayer Ceramic Capacitor 10

Figure 4:
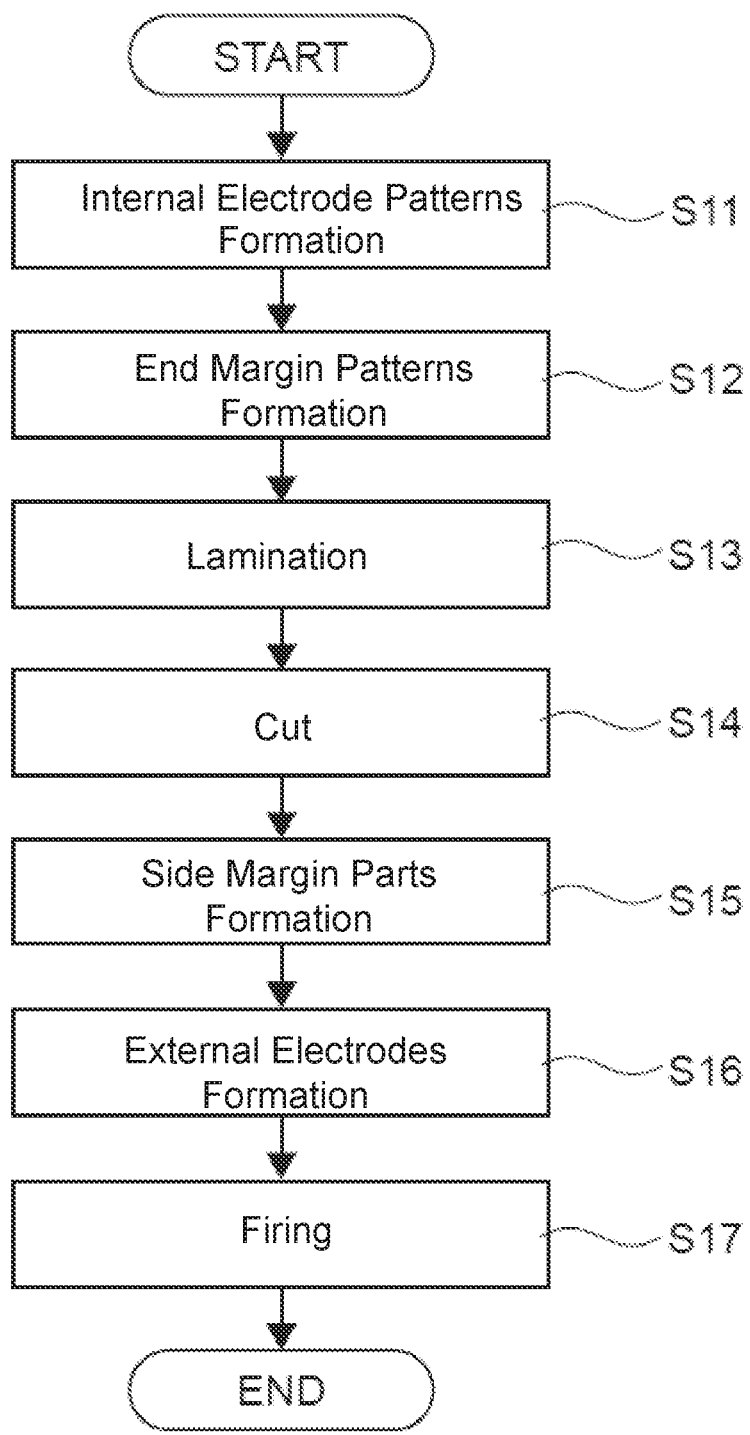
FIG. 4 is a flowchart showing a manufacturing method of the above-mentioned multilayer ceramic capacitor.

A manufacturing method for the multilayer ceramic capacitor 10, which includes a firing process, will be explained. FIG. 4 is a flowchart showing a manufacturing method of the multilayer ceramic capacitor 10. FIGS. 5 to 9B are diagrams schematically showing manufacturing processes of the multilayer ceramic capacitor 10. Hereinafter, a method for manufacturing the multilayer ceramic capacitor 10 will be described along the flowchart of FIG. 4 with reference to FIGS. 5 to 9B.

<3.1 Step S11: Internal Electrode Patterns Formation>

In step S11, internal electrode patterns 112p and 113p are formed on first ceramic sheets 101 and second ceramic sheets 102, respectively, which will form the capacitance forming part 16 and the end margin parts 18.

Figure 5:
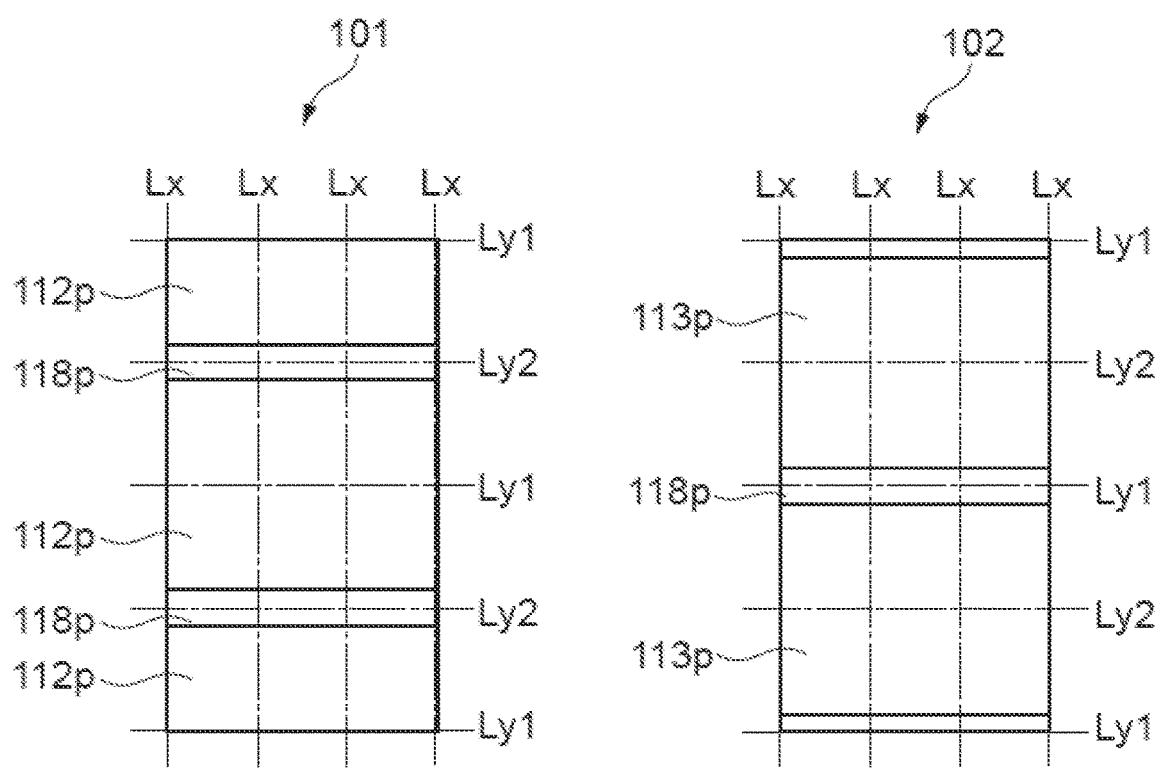
FIG. 5 is a top view showing a manufacturing process of the above-mentioned multilayer ceramic capacitor.
Figure 5:
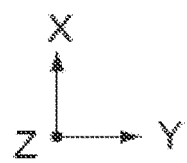

FIG. 5 is a plan view of the ceramic sheets 101 and 102. The ceramic sheets 101 and 102 are each configured as an unfired dielectric green sheet containing a dielectric ceramic as a main component. The ceramic sheets 101 and 102 may contain boron, silicon, and the like as subcomponents in addition to the above-mentioned dielectric ceramic which is a main component. The ceramic sheets 101 and 102 are formed into a sheet shape using, for example, a roll coater or a doctor blade.

At this stage, the ceramic sheets 101 and 102 are configured as large-sized mother sheets that are not yet separated into individual pieces. FIG. 5 shows cutting lines Lx, Ly1 and Ly2 for separating the sheets into each multilayer ceramic capacitor 10. The cutting lines Lx are parallel to the X axis, and the cutting lines Ly1 and Ly2 are parallel to the Y axis.

As shown in FIG. 5, the unfired first internal electrode patterns 112p corresponding to the first internal electrodes 12 are formed on the first ceramic sheet 101, and the unfired second internal electrode patterns 113p corresponding to the second internal electrodes 13 are formed on the second ceramic sheet 102.

The internal electrode patterns 112p and 113p can be formed by applying an appropriate conductive paste to the ceramic sheets 101 and 102. The method for applying the conductive paste can be selected from known techniques as appropriate, and for example, a screen printing method or a gravure printing method can be used.

Each internal electrode pattern 112p on the first ceramic sheet 101 is formed in a band shape extending in the Y-direction along the cutting line Ly1. The internal electrode pattern 112p is not formed on the cutting line Ly2. Each internal electrode pattern 112p is cut along the cutting lines Ly1, Ly2, and Lx to form the first internal electrode 12 of each multilayer ceramic capacitor 10.

Each internal electrode pattern 113p on the second ceramic sheet 102 is formed in a band shape extending in the Y-direction along the cutting line Ly2. The internal electrode pattern 112p is not formed on the cutting line Ly1. That is, the internal electrode pattern 113p is arranged so as to be offset by one element in the X-direction from the internal electrode pattern 112p. Each internal electrode pattern 113p is cut along the cutting lines Ly1, Ly2, and Lx to form the second internal electrode 13 of each multilayer ceramic capacitor 10.

<3.2 Step S12: End Margin Patterns Formation>

In step S12, end margin patterns 118p are formed in regions around the internal electrode patterns 112p and 113p on the first ceramic sheet 101 and the second ceramic sheet 102.

As shown in FIG. 5, the end margin patterns 118p are formed in the regions of the ceramic sheets 101 and 102 where the internal electrode patterns 112p and 113p are not formed. On the first ceramic sheet 101, the end margin pattern 118p is configured as a band region extending along the cutting line Ly2 between the internal electrode patterns 112p adjacent to each other in the X-direction. On the second ceramic sheet 102, the end margin pattern 118p is configured as a band region extending along the cutting line Ly1 between the internal electrode patterns 113p adjacent to each other in the X-direction.

The end margin patterns 118p can be formed by applying a ceramic paste to the regions of the ceramic sheets 101 and 102 where the electrodes are not formed. For the application of the ceramic paste, for example, a screen printing method or a gravure printing method can be used.

The end margin patterns 118p are cut along the cutting lines Ly1, Ly2, and Lx to form a part of the end margin parts 18. The ceramic paste constituting the end margin patterns 118p is includes, as a main component, a dielectric ceramic such as a ceramic material having a perovskite structure represented by the general formula $ABO_3$ as a main phase, for example. Further, the ceramic paste contains boron and may further contain other subcomponents such as silicon. The born and silicon are added to the ceramic paste. The suitable amounts of boron and silicon in the end margin parts 118p will be described later.

<3.3 Step S13: Lamination>

Figure 6:
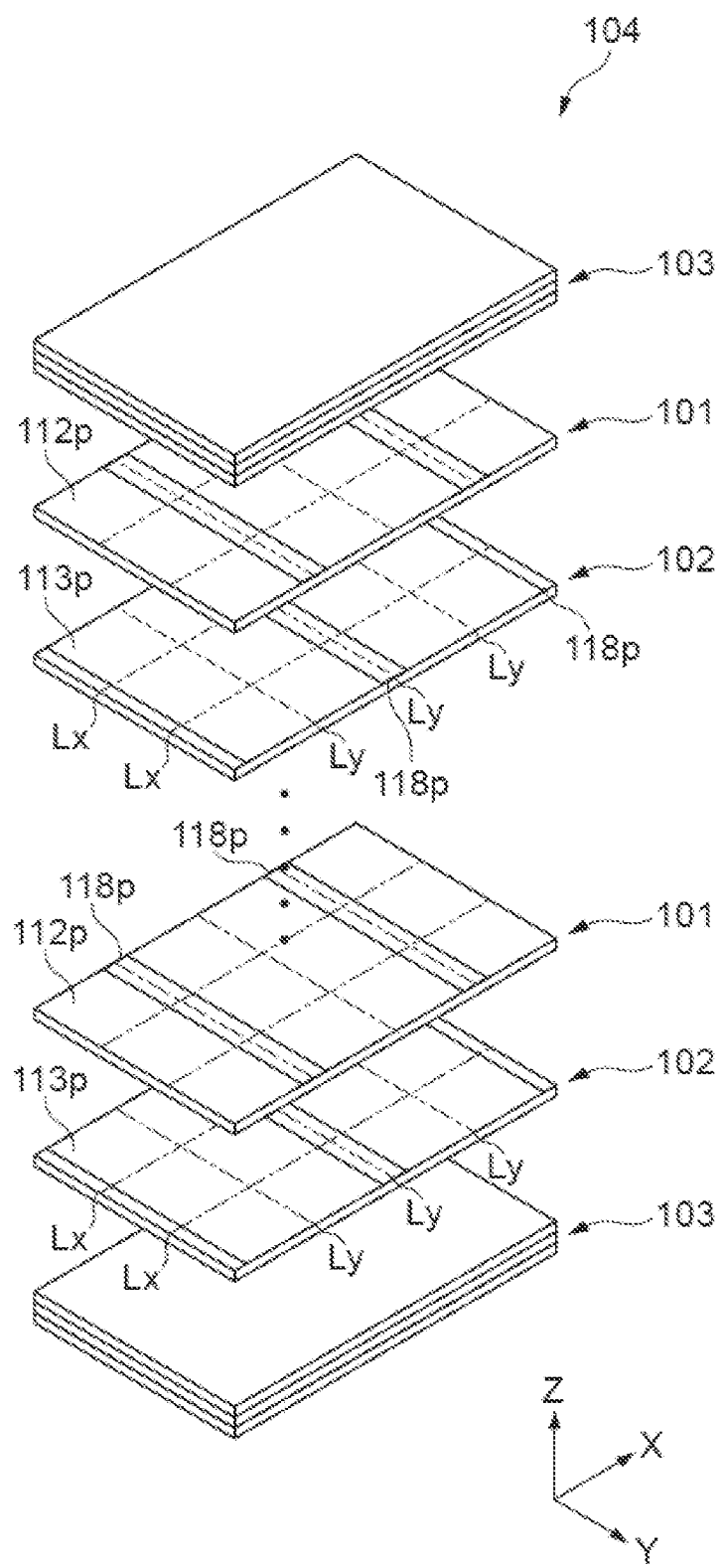
FIG. 6 is a perspective view showing a manufacturing process of the above-mentioned multilayer ceramic capacitor.

In step S13, the laminated sheets 104 are produced by laminating the ceramic sheets 101, 102 prepared in steps S11 and S12 and third ceramic sheets 103, as shown in FIG. 6. The third ceramic sheets 103 are each a ceramic sheet on which the internal electrode patterns 112p and 113p and the end margin pattern 118p are not formed.

In the laminated sheets 104, the first ceramic sheets 101 and the second ceramic sheets 102 are alternately laminated in the Z-direction, and the third ceramic sheets 103 are laminated on the upper and lower surfaces along the Z-axis of that laminated body. The laminated body of the ceramic sheets 101 and 102 corresponds to the capacitance forming part 16 and the end margin parts 18 after firing. The laminated body of the third ceramic sheets 103 corresponds to the cover parts 19 after firing. The number of layers of the ceramic sheets 101, 102, and 103 is not limited to the illustrated example, and can be adjusted as appropriate.

The laminated sheets 104 are formed into a unitary body by press-joining the ceramic sheets 101, 102, and 103. For press-joining the ceramic sheets 101, 102, and 103, for example, hydrostatic pressing or uniaxial pressing is preferably used. This makes it possible to increase the density of the laminated sheets 104.

<3.4 Step S14: Cut>

Figure 7:
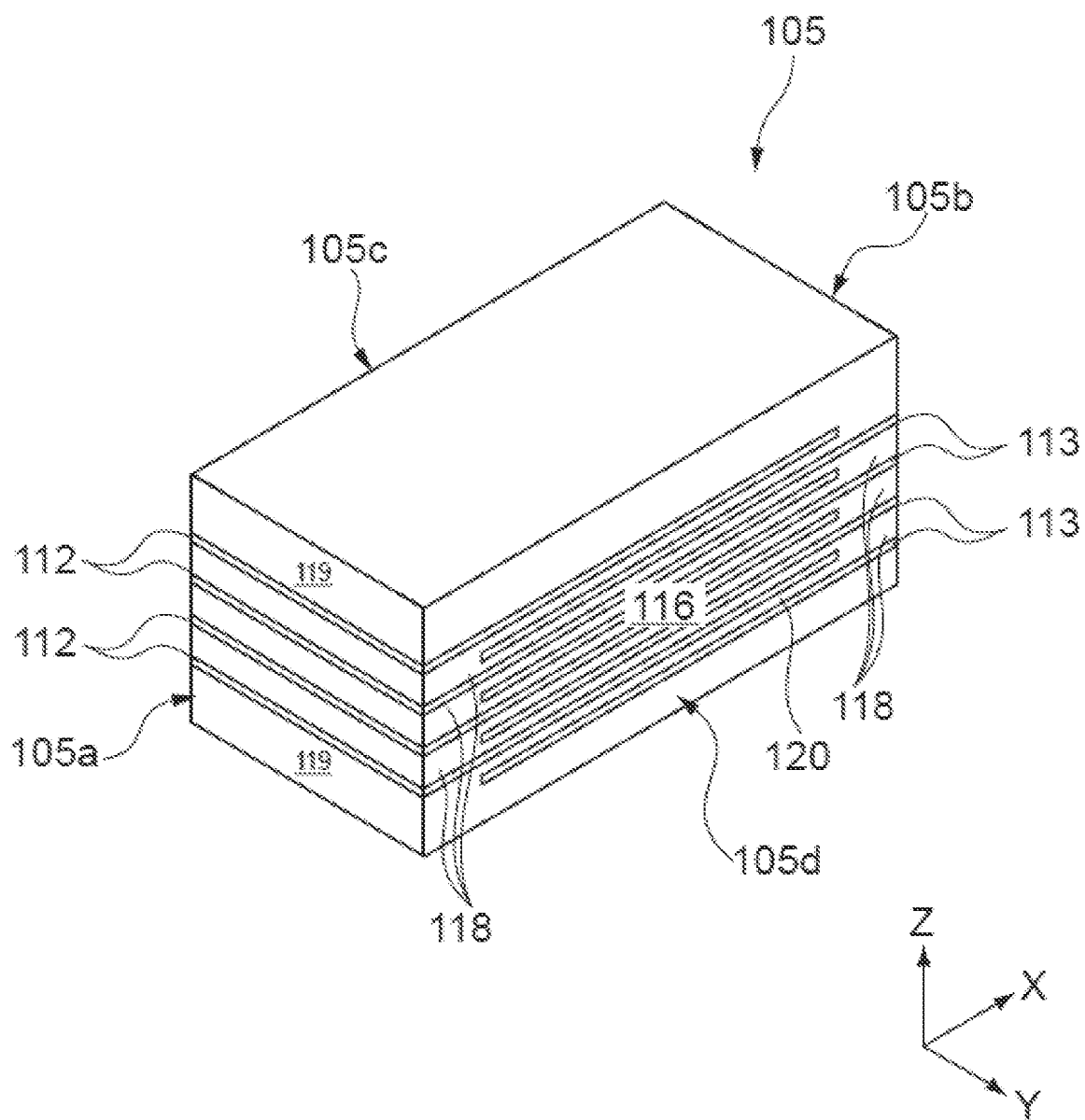
FIG. 7 is a perspective view showing a manufacturing process of the above-mentioned multilayer ceramic capacitor.

In step S14, the laminated sheets 104 obtained in step S13 are cut along the cutting lines Lx, Ly1, and Ly2 to produce a plurality of unfired laminated chips 105, one of which is shown in FIG. 7. The laminated chip 105 corresponds to a laminated body constituted of a capacitance forming part 16, the end margin parts 18, and the cover part s19.

That is, the laminated chip 105 includes: an unfired capacitance forming part 116 in which the internal electrodes 112 and 113 are alternately laminated with the ceramic layers 120 sandwiched therebetween; unfired end margin parts 118 provided respectively between the first end surface 105a and the second internal electrodes 113 and between the second end surface 105b and the first internal electrodes 112; and cover parts 119 covering both sides of the capacitance forming part 116 in the Z-direction. The ceramic layers 120 are formed by cutting the ceramic sheets 101 and 102.

The end surfaces 105a and 105b of the laminated chip 105 respectively facing in the negative and positive X-directions correspond to the cut surfaces obtained by cutting along the cutting lines Ly1 and Ly2, respectively. The side surfaces 105c and 105d of the laminated chip 105 respectively facing in the negative and positive Y-directions correspond to the cut surfaces obtained by cutting along the cutting lines Lx. From the side surfaces 105c and 105d, the edges of the unfired internal electrodes 112 and 113, which are cut surfaces of the internal electrode patterns 112p and 113p, are exposed.

<3.5 Step S15: Side Margin Formation>

In step S15, side margin parts 117 are formed on the side surfaces 105c and 105d of the laminated chip 105. As a result, the unfired ceramic main body 111 as shown in FIG. 8 is produced.

The side margin parts 117 contain an unfired ceramic material, and is specifically formed of a ceramic sheet or a ceramic slurry. The side margin parts 117 can be formed, for example, by attaching a ceramic sheet to the side surfaces 105c and 105d of the laminated chip 105. Alternatively, the side margin part 117 can also be formed by coating the side surfaces 105c and 105d of the laminated chip 105 with a ceramic slurry by, for example, coating or dipping.

The side margin parts 117 are mainly composed of a dielectric ceramic and, for example, made of a ceramic material having a perovskite structure represented by the general formula $ABO_3$ as a main phase. Further, the side margin parts 117 may contain subcomponents such as boron and silicon. Boron and silicon are added in the ceramic material. The suitable amounts of boron and silicon added to the side margin portion 117 will be described later.

Figure 8:
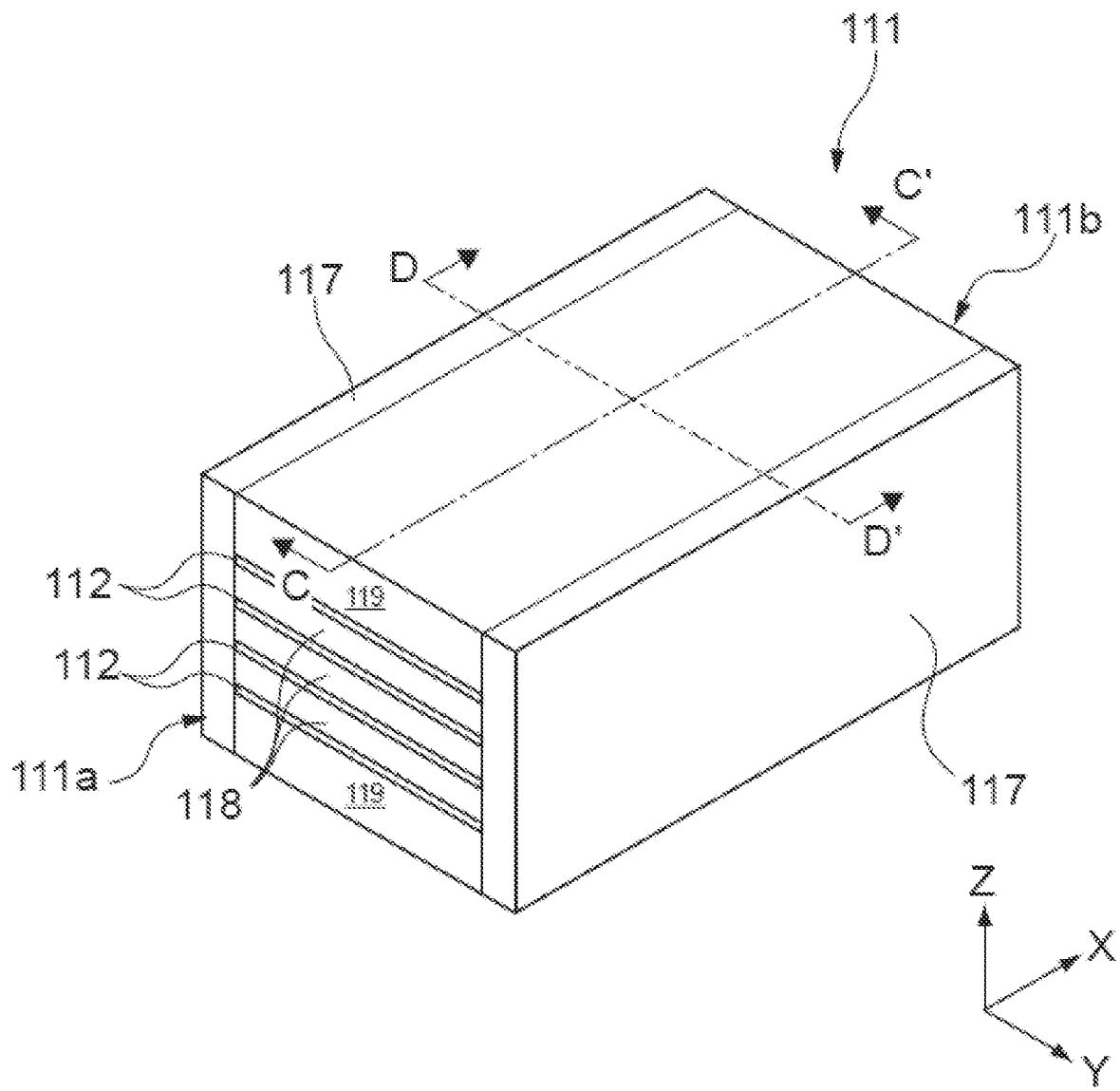
FIG. 8 is a perspective view showing a manufacturing process of the above-mentioned multilayer ceramic capacitor.

As shown in FIG. 8, the ceramic main body 111 includes: a first end surface 111a and a second end surface 111b respectively facing in the negative and positive X-directions; an unfired capacitance forming part 116 (see FIG. 7); unfired end margin parts 118 provided respectively between the first end surface 111a and the second internal electrodes 113 and between the second end surfaced 111b and the first internal electrodes 112; unfired side margin parts 117 respectively covering the capacitance forming part 116 from the positive and negative Y-directions; and unfired cover parts 119.

Figure 9A:
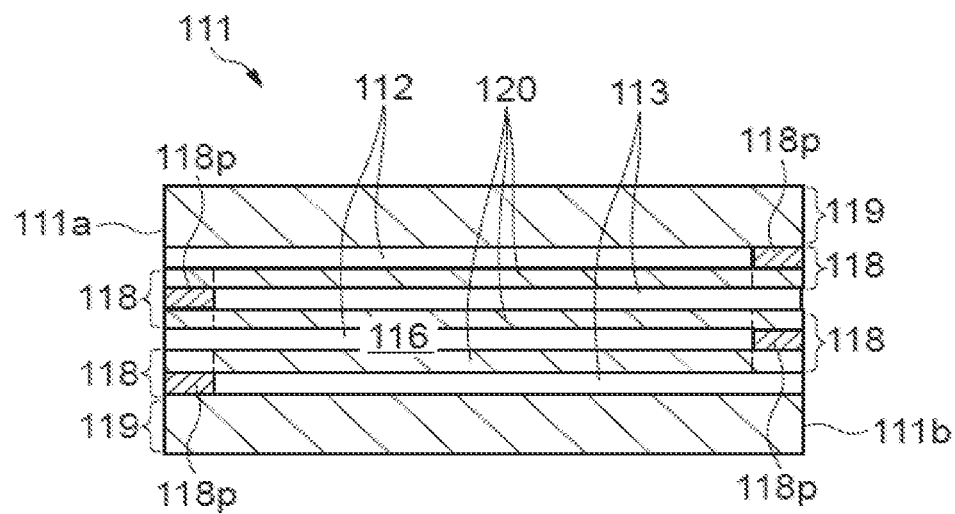
FIGS. 9A-9B are schematic cross-sectional views showing a manufacturing process of the above-mentioned multilayer ceramic capacitor.
Figure 9B:
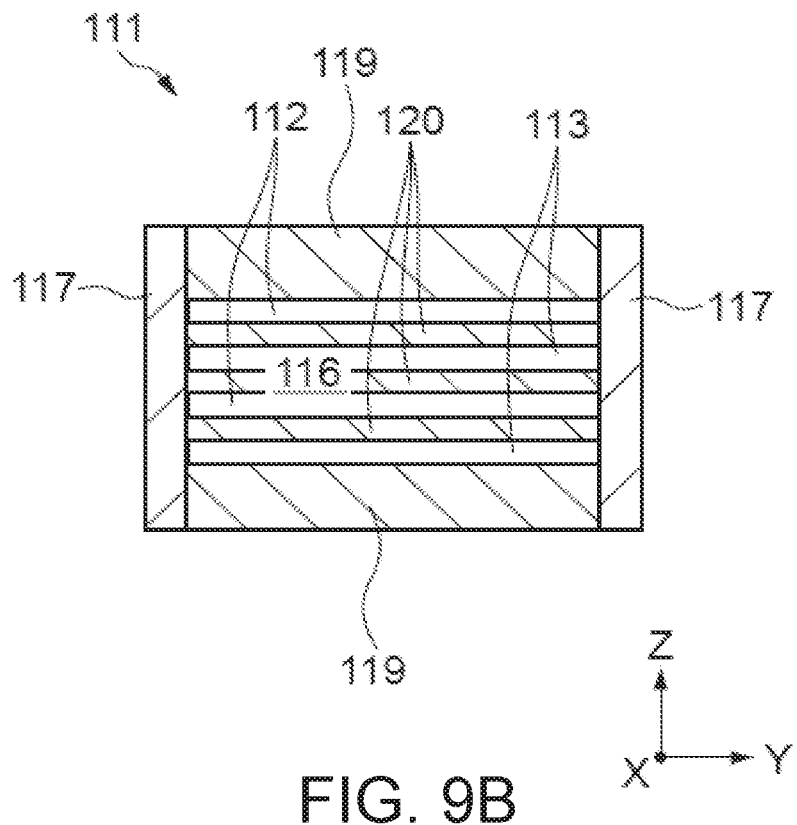

FIGS. 9A and 9B are schematic cross-sectional views of the ceramic main body 111. FIG. 9A is a schematic cross-sectional view taken along the line C-C' of FIG. 8, and FIG. 9B is a schematic cross-sectional view taken along the line D-D' of FIG. 8. In FIGS. 9A and 9B, the number of layers of the internal electrodes 112 and 113 and the ceramic layer 120 is shown to be smaller than that in FIG. 8 for the sake of explanation. Further, in FIGS. 9A and 9B, hatching of the internal electrodes 112 and 113 is omitted.

As shown in FIG. 9A, the end margin parts 118 of the present embodiment are formed of the ceramic layers 120, which are cut from the ceramic sheets 101 and 102, and the end margin patterns 118p. The side margin parts 117 are formed of the above-mentioned ceramic sheet or ceramic slurry.

In this embodiment, the end margin patterns 118p have a higher boron concentration than the ceramic sheets 101, 102 and the side margin parts 117. For example, the boron concentration in the end margin patterns 118p is 0.15 atm % or more and 0.30 atm % or less when the concentration of the element at the B site (titanium (Ti) when the main component is barium titanate ($BaTiO_3$)) of the ceramic material of the end margin pattern 118p is set to 100 atm %. On the other hand, the boron concentration in the ceramic sheets 101 and 102 (ceramic layer 120) and the side margin parts 117 is less than 0.15 atm %, for example, when the elemental concentration of B site (titanium (Ti) when the main component is barium titanate ($BaTiO_3$)) of the ceramic material as the main component of these members is set to 100 atm %.

As a result, the end margin parts 118, which are composed of the end margin patterns 118p and the ceramic sheets 101 and 102 (ceramic layer 120), as a whole contain boron at a higher concentration than that of the side margin parts 117.

Further, the side margin parts 117 may contain silicon. The ceramic layers 120 and the end margin patterns 118p may also contain silicon, but for example, the side margin parts 117 contain a higher concentration of silicon than the ceramic layers 120 and the end margin patterns 118p. The silicon concentration of the side margin parts 117 is, for example, 1.0 atm % or more and 3.0 atm % or less when the concentration of the element at the B site of the ceramic material in the side margin parts 117 is set to 100 atm %.

Since the end margin parts 118 and the side margin parts 117 have the above-mentioned configuration, the end margin parts 118 and the side margin parts 117 show preferable sintering behaviors in the firing step described later. Here it should be noted that since boron and silicon volatilize in the firing step described later, their concentrations are reduced in the final product.

<3.6 Step S16: External Electrodes Formation>

In step S16, unfired external electrodes 14 and 15 are respectively formed on the end surfaces 111a and 111b of the ceramic main body 111 obtained in step S15. The unfired external electrodes 14 and 15 are formed, for example, by applying a conductive paste to the end surfaces 111a and 111b. The coating method is not particularly limited, and a dip method, a printing method, or the like can be appropriately selected.

<3.7 Step S17: Firing>

In step S17, the multilayer ceramic capacitor 10 shown in FIGS. 1 to 3 is produced by firing the unfired ceramic main body 111 on which the external electrodes 14 and 15 are formed in step S16. That is, in step S17, the capacitance forming part 116 becomes the capacitance forming part 16, the side margin parts 117 become the side margin parts 17, the end margin parts 118 become the end margin parts 18, and the cover parts 119 becomes the cover parts 19. The firing can be performed, for example, in a reducing atmosphere or a low oxygen partial pressure atmosphere.

In step S17, first, sintering is started from the internal electrodes 112 and 113 and the external electrodes 14 and 15, which are made of metal having a lower sintering temperature. That is, the internal electrodes 112 and 113 and the external electrodes 14 and 15 start shrinking before ceramics.

In this embodiment, the end margin parts 118 contain a relatively high concentration of boron. As described above, boron has an effect of lowering the sintering temperature even in a small amount. Therefore, the sintering temperature of the end margin parts 118 sandwiched between the external electrodes 14 and 15 and the internal electrodes 112 and 113 decreases, and the end margin parts 118 shrink in a manner similar to the shrinkage of the external electrodes 14 and 15 and the internal electrodes 112 and 113. As a result, it is possible to prevent the external electrodes 14, 15 and the internal electrodes 112, 113 from shrinking more than the end margin parts 118, thereby preventing their separation. Therefore, the connection between the first internal electrodes 12 and the first external electrode 14 and the connection between the second internal electrodes 13 and the second external electrode 15 can be secured.

On the other hand, the side margin parts 117 contain a lower concentration of boron than the end margin parts 118. While boron has a high effect of improving sinterability, it also has a risk of promoting oversintering with respect to the side margin parts 117, which have a high degree of exposure to the firing atmosphere. In particular, when firing in a reducing atmosphere, there is an increased risk that boron promotes oversintering of the side margin parts 117. When the side margin part 117 is in an oversintered state, the grain growth of the ceramic grains is promoted in the side margin parts 117, and excessive grain growth occurs.

If the ceramic grains in the side margin parts 117 in the vicinity of the internal electrodes 112 and 113 (capacitance forming part 116) grow excessively, the fine layer structure of the internal electrodes 112 and 113 may be disturbed. Specifically, the lateral ends of the internal electrodes 112 and 113 are fragmented under the influence of the grown ceramic grains. As a result, melted portions of the internal electrodes become spherical, and the internal electrodes approach each other along the Z-axis, resulting in a decrease in insulating property. In addition, since the shape of the internal electrodes changes, the intersecting area decreases and the capacitance decreases.

Therefore, by suppressing the boron concentration of the side margin parts 117, the risk of oversintering and abnormal grain growth can be suppressed, and the insulation failure of the internal electrodes 12 and 13 can be suppressed.

Further, the side margin parts 117 contain silicon. Silicon has the effect of lowering the sintering temperature while suppressing the risk of oversintering by slowly increasing the sinterability as compared with boron. In the side margin parts 117, the firing temperature can be lowered while suppressing oversintering and the accompanying abnormal grain growth of ceramic particles by the cooperation of silicon and a small amount of boron. As a result, the side margin parts 17 shrink in a similar manner to the shrinkage of the internal electrodes 12 and 13, and therefore, the stress generated in the side margin parts 17 due to the shrinkage of the internal electrodes 12 and 13 can be suppressed. Therefore, structural defects such as cracks between the side margin parts 17 and the capacitance forming part 16 can be prevented, and insulation defects associated therewith can be suppressed.

The firing temperature in step S17 can be determined based on the sintering temperature of the ceramic main body 111. In the present embodiment, boron and silicon as sintering aids are added to the ceramic material constituting the ceramic main body 111. Therefore, for example, when a barium titanate ($BaTiO_3$) system material is used, it can be fired at a relatively low temperature of about 1000° C. to 1200° C.

The multilayer ceramic capacitor 10 is manufactured by the above manufacturing method. A plating film may be further formed on the external electrodes 14 and 15 after firing.

4. Working Example

As a Working Example of the first embodiment, a sample of a multilayer ceramic capacitor was manufactured using the above manufacturing method. In this sample, the dimension in the X-direction was about 660 μm, the dimension in the Y-direction was about 340 μm, and the dimension in the Z-direction was about 300 μm. Further, the firing temperature was selected to a temperature in the range of 1000° C. to 1200° C. at which the pore ratio of the side margin part 17 was 5% or less after firing. Here, the pore ratio is defined as the ratio of the pore area in the image obtained by capturing a cross section of the side margin part 17.

In the above sample, the boron concentration of the ceramic sheets 101 and 102 was 0.26 atm % when the element concentration of titanium (Ti) contained in barium titanate ($BaTiO_3$), which is the main component of the ceramic material, is set to 100 atm %. The boron concentration of the end margin pattern 118p was 0.26 atm % when the element concentration of titanium was set to 100 atm % in the same manner. The boron concentration of the side margin part 117 was 0.13 atm % when the element concentration of titanium was set to 100 atm % in the same manner.

Further, the silicon concentration of the ceramic sheets 101 and 102 was 2.0 atm % when the element concentration of titanium was set to 100 atm % as in the case of boron. The silicon concentration of the end margin pattern 118p was 2.0 atm % when the element concentration of titanium was set to 100 atm % in the same manner. The silicon concentration of the side margin part 117 was 2.0 atm % when the element concentration of titanium was set to 100 atm % in the same manner.

In order to confirm the boron concentration distribution and silicon concentration distribution in the produced sample multilayer ceramic capacitor 10, the boron concentration distribution and silicon concentration of the ceramic main body 11 of the multilayer ceramic capacitor 10 were measured by LA-ICP-MS (laser ablation ICP mass spectrometry).

First, in order to measure the boron concentration distribution and the silicon concentration distribution of the side margin part 17, the ceramic main body 11 of the sample is cut along the Y-Z plane to produce a measurement sample having the cut surface facing in the X-direction.

Figure 10:
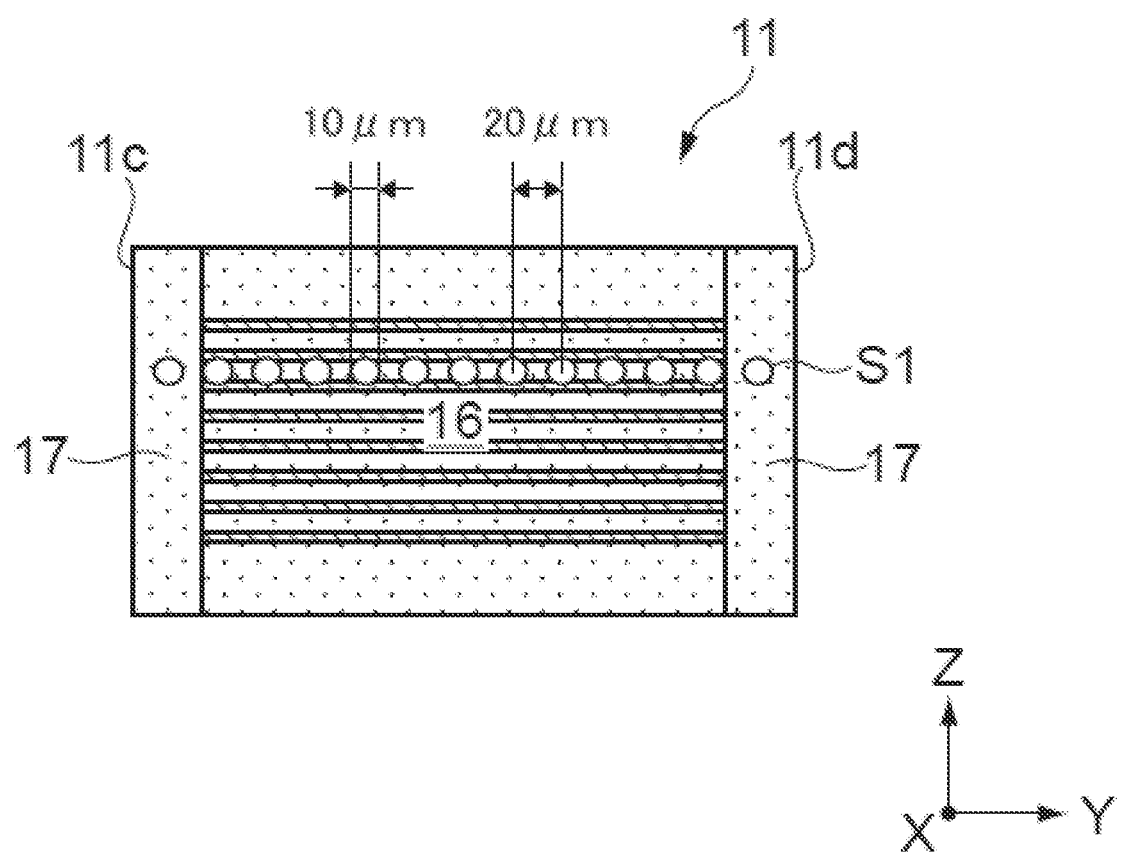
FIG. 10 is a cross-sectional view showing a laser irradiation method by LA-ICP-MS to the above-mentioned multilayer ceramic capacitor according to the first embodiment of this disclosure.

Next, as shown in FIG. 10, a plurality of irradiation spots Si were generated by spot-irradiating the cut surface of the measurement sample with laser light a plurality of times. Then, the elemental composition of the fine particles volatilized from the irradiation spot S1 was analyzed by LA-ICP-MS.

In radiating the laser light, a plurality of spots were spot-irradiated so as to traverse in the Y-direction from the side margin part 17 on one side surface 11c side of the ceramic main body 11 to the ceramic layer 20 on the capacitance forming part 16 and to the side margin part 17 on the second side surface 11d side, so as to generate irradiation spots Si each having a diameter of 10 μm and a spot interval of 20 μm. The irradiation conditions of the laser light were: the energy of 11 J/cm² to 12 J/cm², the frequency of 10 Hz, and the laser irradiation time of 15 seconds at each irradiation spot S1. The number of irradiation spots shown in FIG. 10 is smaller than the actual number of irradiation spots for ease of illustration.

Then, the boron concentration and the silicon concentration at each spot position were determined based on the number of boron atoms and the number of silicon atoms counted from the fine particles volatilized from the irradiation spot S1. The results are shown in Table 1 and FIG. 11.

Table 1 shows the values of the boron concentration (B) and the silicon concentration (Si) calculated at each irradiation spot S1.

Figure 11:
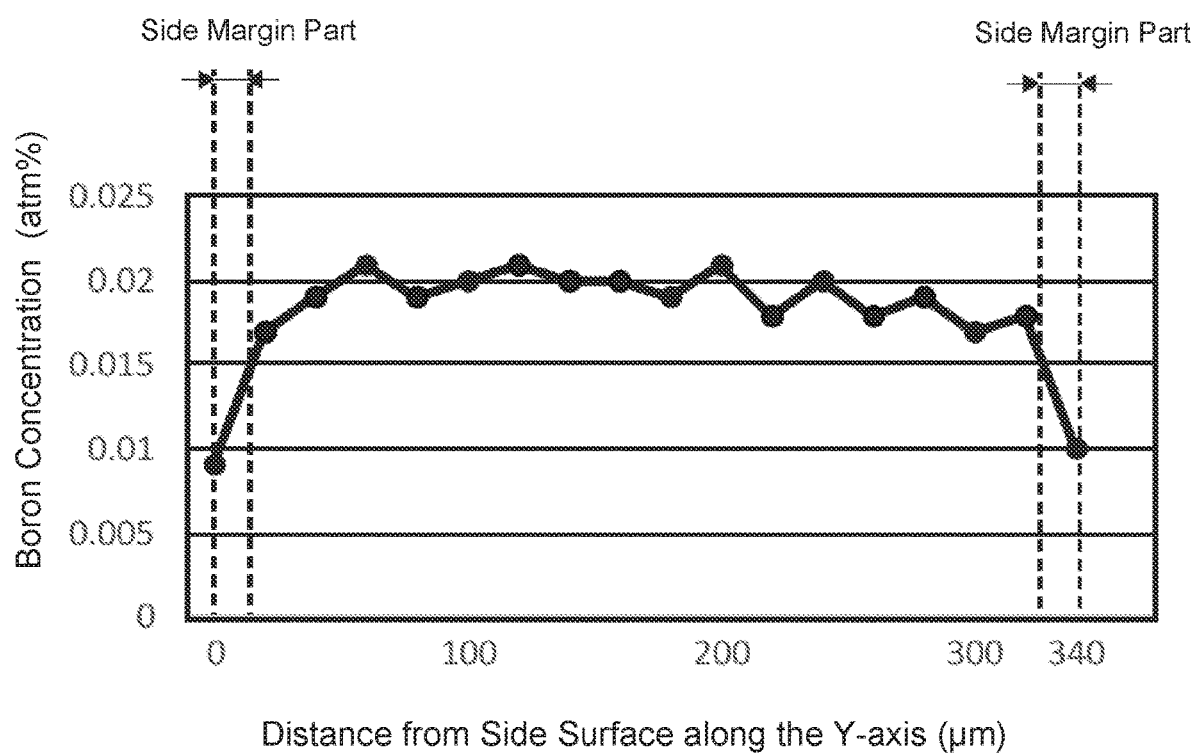
FIG. 11 is a graph of the boron concentration in the Y-direction of the ceramic layer and the side margin parts of the above-mentioned multilayer ceramic capacitor.

FIG. 11 is a line graph showing the boron concentration distribution corresponding to Table 1. Specifically, FIG. 11 is a graph showing a relationship between the boron concentration (vertical axis) determined based on the number of fine particles volatilized from each irradiation spot Si and the distance in the Y-direction from the first side surface 11c of the ceramic main body 11 (horizontal axis).

TABLE 1

| Distance from the side surface (μm) | B (atm %) | Si (atm %) |
|---|---|---|
| 0 | 0.009 | 2.0 |
| 20 | 0.017 | 2.0 |
| 40 | 0.019 | 1.5 |
| 60 | 0.021 | 1.7 |
| 80 | 0.019 | 1.7 |
| 100 | 0.020 | 1.5 |
| 120 | 0.021 | 1.3 |
| 140 | 0.020 | 1.7 |
| 160 | 0.020 | 1.6 |
| 180 | 0.019 | 1.5 |
| 200 | 0.021 | 1.3 |
| 220 | 0.018 | 1.4 |
| 240 | 0.020 | 1.6 |
| 260 | 0.018 | 1.7 |
| 280 | 0.019 | 1.6 |
| 300 | 0.017 | 1.5 |
| 320 | 0.018 | 1.5 |
| 340 | 0.010 | 2.1 |

From FIG. 11, it can be seen that the boron concentration is low in the side margin parts 17 at the sides of the side surfaces 11c and 11d, and the boron concentration increases as the measurement points move into the capacitance forming part in the Y-direction. Indeed, as shown in Table 1, the boron concentrations in the side margin parts 17 at 0 μm and 340 μm from the first side surface 11c were 0.009 atm % and 0.010 atm %, respectively. Further, in the ceramic layer 120 of the capacitance forming part 16, which spans from 40 μm to 300 μm from the first side surface 11c, the boron concentration was in the range of 0.017 atm % to 0.021 atm %.

Further, from Table 1, it can be seen that the silicon concentrations of the side margin parts 17 at 0 μm and 340 μm from the first side surface 11c were 2.0 atm % and 2.1 atm %, respectively. Further, in the ceramic layer 120 of the capacitance forming part 16, which spans from 40 μm to 300 μm from the first side surface 11c, the silicon concentration was in the range of 1.3 atm % to 1.7 atm %.

Subsequently, in order to measure the boron concentration distribution and the silicon concentration distribution of the end margin parts 18, the ceramic main body 11 of the sample is cut along the X-Z plane to produce a measurement sample having the cut surface facing in the Y-direction.

Figure 12:
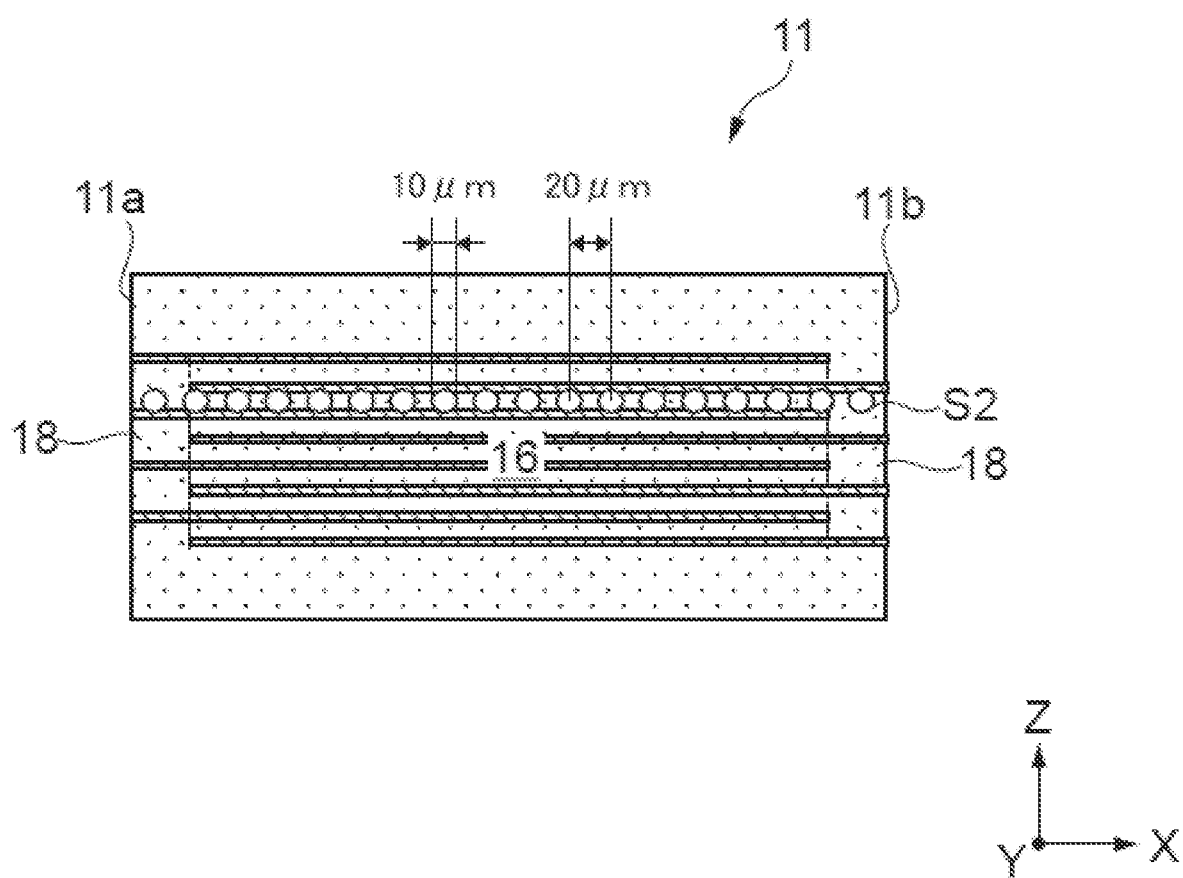
FIG. 12 is a cross-sectional view showing a laser irradiation method by LA-ICP-MS to the above-mentioned multilayer ceramic capacitor of the first embodiment of this disclosure.

Then, as shown in FIG. 12, a plurality of irradiation spots S2 were generated by spot-irradiating the cut surface of the measurement sample with laser light a plurality of times. Then, the elemental composition of the fine particles volatilized from the irradiation spot S2 was analyzed by LA-ICP-MS.

In irradiating the laser beam, a plurality of spots were spot-irradiated so as to traverse in the X-direction from the end margin part 18 on the first end surface 11a side of the ceramic main body 11 to the ceramic layer 20 on the capacitance forming part 16 and to the end margin part 18 on the second end surface 11b side, so as to generate a plurality of irradiation spots S2 having a diameter of 10 μm and a spot interval of 20 μm. The irradiation conditions of the laser beam were the same as those for the measurement on the side margin parts 17. The number of irradiation spots shown in FIG. 12 is smaller than the actual number of irradiation spots for ease of illustration.

Then, the boron concentration and the silicon concentration at each spot position were determined based on the number of boron atoms and the number of silicon atoms counted from the fine particles volatilized from the irradiation spot S2. The results are shown in Table 2 and FIG. 13.

Table 2 shows the values of the boron concentration (B) and the silicon concentration (Si) determined at each irradiation spot S2.

Figure 13:
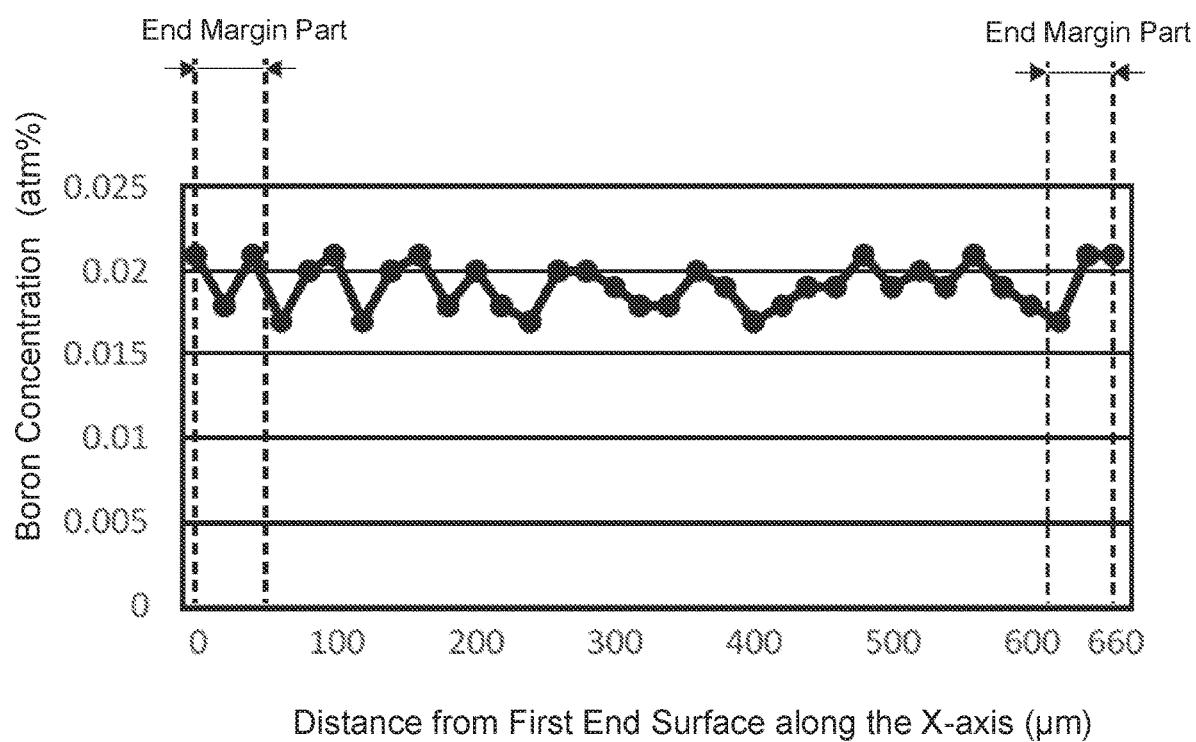
FIG. 13 is a graph of the boron concentration in the X-direction of the ceramic layer and the end margin parts of the above-mentioned multilayer ceramic capacitor.

FIG. 13 is a line graph showing the boron concentration distribution corresponding to Table 2. Specifically, FIG. 13 shows a relationship between the boron concentration (vertical axis) determined based on the number of fine particles volatilized from each irradiation spot S1 and the distance in the X-direction from the first end surface 11a of the ceramic main body 11 (horizontal axis).

TABLE 2

| Distance from the end surface (μm) | B (atm %) | Si (atm %) |
|---|---|---|
| 0 | 0.021 | 1.9 |
| 20 | 0.018 | 1.8 |
| 40 | 0.021 | 1.7 |
| 60 | 0.017 | 1.5 |
| 80 | 0.020 | 1.6 |
| 100 | 0.021 | 1.7 |
| 120 | 0.017 | 1.5 |
| 140 | 0.020 | 1.7 |
| 160 | 0.021 | 1.3 |
| 180 | 0.018 | 1.5 |
| 200 | 0.020 | 1.4 |
| 220 | 0.018 | 1.4 |
| 240 | 0.017 | 1.4 |
| 260 | 0.020 | 1.6 |
| 280 | 0.020 | 1.5 |
| 300 | 0.019 | 1.4 |
| 320 | 0.018 | 1.6 |
| 340 | 0.018 | 1.3 |
| 360 | 0.020 | 1.4 |
| 380 | 0.019 | 1.7 |
| 400 | 0.017 | 1.6 |
| 420 | 0.018 | 1.4 |
| 440 | 0.019 | 1.5 |
| 460 | 0.019 | 1.7 |
| 480 | 0.021 | 1.3 |
| 500 | 0.019 | 1.6 |
| 520 | 0.020 | 1.3 |
| 540 | 0.019 | 1.3 |
| 560 | 0.021 | 1.7 |
| 580 | 0.019 | 1.3 |
| 600 | 0.018 | 1.3 |
| 620 | 0.017 | 1.5 |
| 640 | 0.021 | 1.8 |
| 660 | 0.021 | 1.9 |

From FIG. 13, it was found that the boron concentration in the end margin parts 18 was at the same level as that in the capacitance forming part 16. As shown in Table 2, in the end margin parts 18 at 0 μm, 20 μm, 40 μm, 620 μm, 640 μm, and at 660 μm from the first end surface 11a, the boron concentrations were 0.021 atm %, 0.018 atm % and 0.021 atm %, 0.017 atm %, 0.021 atm %, and 0.021 atm %, respectively. Further, in the ceramic layer 120 of the capacitance forming part 16 at 60 μm to 600 μm from the first end surface 11a, the boron concentration was in the range of 0.017 atm % to 0.021 atm %.

Further, from Table 2, in the end margin parts 18 at 0 μm, 20μm, 40μm, 620μm, 640μm, and 660 μm from the first end surface 11a, the silicon concentrations were 1.9 atm %, 1.8 atm % and 1.7 atm %, 1.5 atm %, 1.8 atm % and 1.9 atm %, respectively. Further, in the ceramic layer 120 of the capacitance forming part 16 at 60 μm to 600 μm from the first end surface 11a, the silicon concentration was in the range of 1.3 to 1.7 atm %.

From these results, it was confirmed that the end margin parts 18 contained a higher concentration of boron than the side margin parts 17. Further, it was confirmed that the boron concentration in the end margin parts 18 was 0.015 atm % or more and 0.025 atm % or less.

It was also confirmed that the side margin parts 17 contained silicon and had a higher concentration of silicon than the end margin parts 18.

Further, when each of the cut surfaces of this Working Example sample was observed by SEM (Scanning Electron Microscope), no structural defects such as cracks between the side margin part 17 and the capacitance forming part 16 were observed. Further, no separation between the external electrodes 14 and 15 and the internal electrodes 12 and 13 at the end surfaces 11a and 11b was observed.

Further, when a DC voltage of 4 V was applied to 1000 samples of this Working Example and the rate of samples having a resistivity of 1 MΩ or less (IR defect rate) was examined. The IR defect rate was less than 0.5%, which is very low. From these results, it was confirmed that the multilayer ceramic capacitor 10 of the Working Example can suppress insulation defects and also suppress connection defects between the external electrodes 14 and 15 and the internal electrodes 12 and 13.

II. Second Embodiment

In the above embodiment, as a method for producing the unfired ceramic main body 111, a method in which the side margin parts 117 are retrofitted has been described, but the present invention is not limited to this. For example, in this second embodiment, the side margin parts may be formed from dielectric patterns between the internal electrode patterns as in the case of the end margin parts.

In the following embodiment, the same reference numerals are given to the same configurations as those in the first embodiment, and the description thereof will be omitted.

1. Configuration of Multilayer Ceramic Capacitor 30

Figure 14:
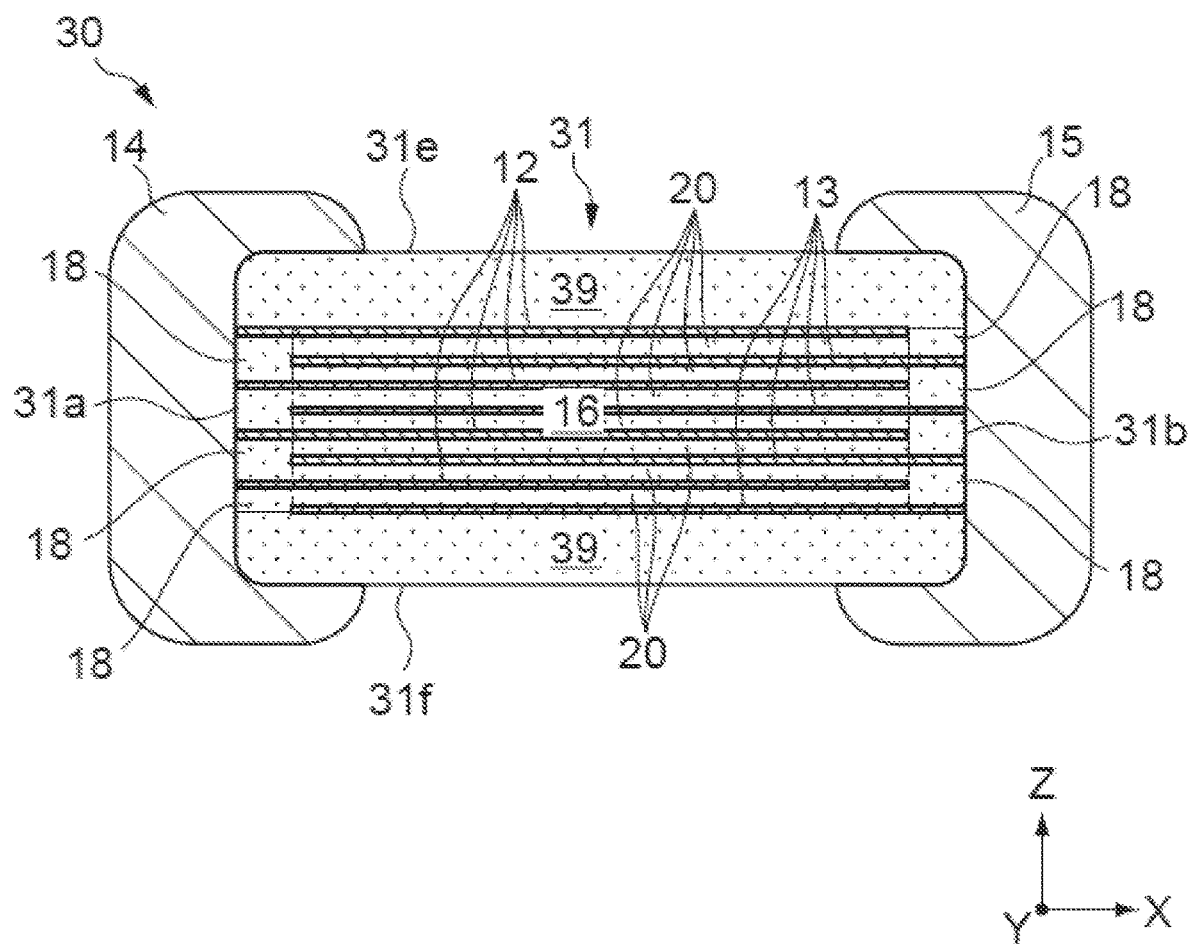
FIG. 14 is cross-sectional view of a multilayer ceramic capacitor according to a second embodiment of this disclosure, corresponding to FIG. 2.
Figure 15:
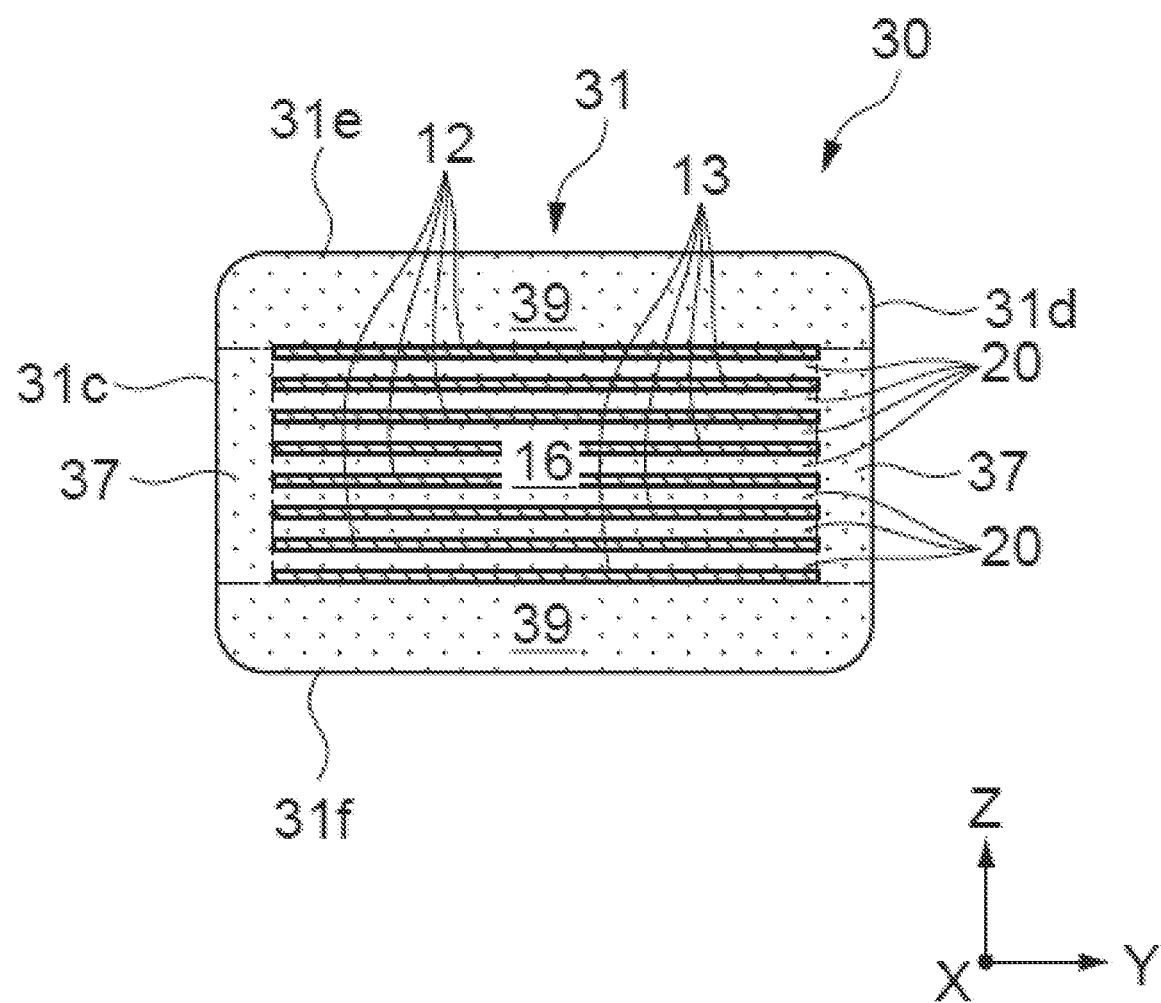
FIG. 15 is cross-sectional view of the multilayer ceramic capacitor of the second embodiment, corresponding to FIG. 3.

FIGS. 14 and 15 are diagrams showing a multilayer ceramic capacitor 30 according to a second embodiment of the present disclosure. FIG. 14 is a cross-sectional view showing a cross section of the multilayer ceramic capacitor 30 corresponding to FIG. 2. FIG. 15 is a cross-sectional view showing a cross section of the multilayer ceramic capacitor 30 corresponding to FIG. 3.

The multilayer ceramic capacitor 30 includes a ceramic main body 31, a first external electrode 14, and a second external electrode 15. The ceramic main body 31 has a first end surface 31a and a second end surface 31b respectively facing in the negative and positive X-directions, a first side surface 31c and a second side surface 31d respectively facing in the negative and positive Y-directions and a first main surface 31e and a second main surface 31f respectively facing in the positive and negative Z-directions. The first external electrode 14 is provided on the first end surface 31a. The second external electrode 15 is provided on the second end surface 31b.

The ceramic main body 31 has a capacitance forming part 16, side margin parts 37, end margin parts 18, and cover parts 39. That is, in the ceramic main body 31, the configurations of the side margin parts 37 and the cover part s39 are different from those of the ceramic main body 11 of the first embodiment.

In the present embodiment, the side margin parts 37 cover the capacitance forming part 16 and the end margin part 18 along the Y-axis. The cover parts 39 are provided above and below, along the Z-axis, the capacitance forming part 16, the end margin parts 18, and the side margin parts 37.

The end margin parts 18 contain boron as in the first embodiment. The side margin parts 37 also contains boron having a concentration lower than that of the end margin parts 18 and silicon, as in the first embodiment.

2. Manufacturing Method of Multilayer Ceramic Capacitor 30

Figure 16:
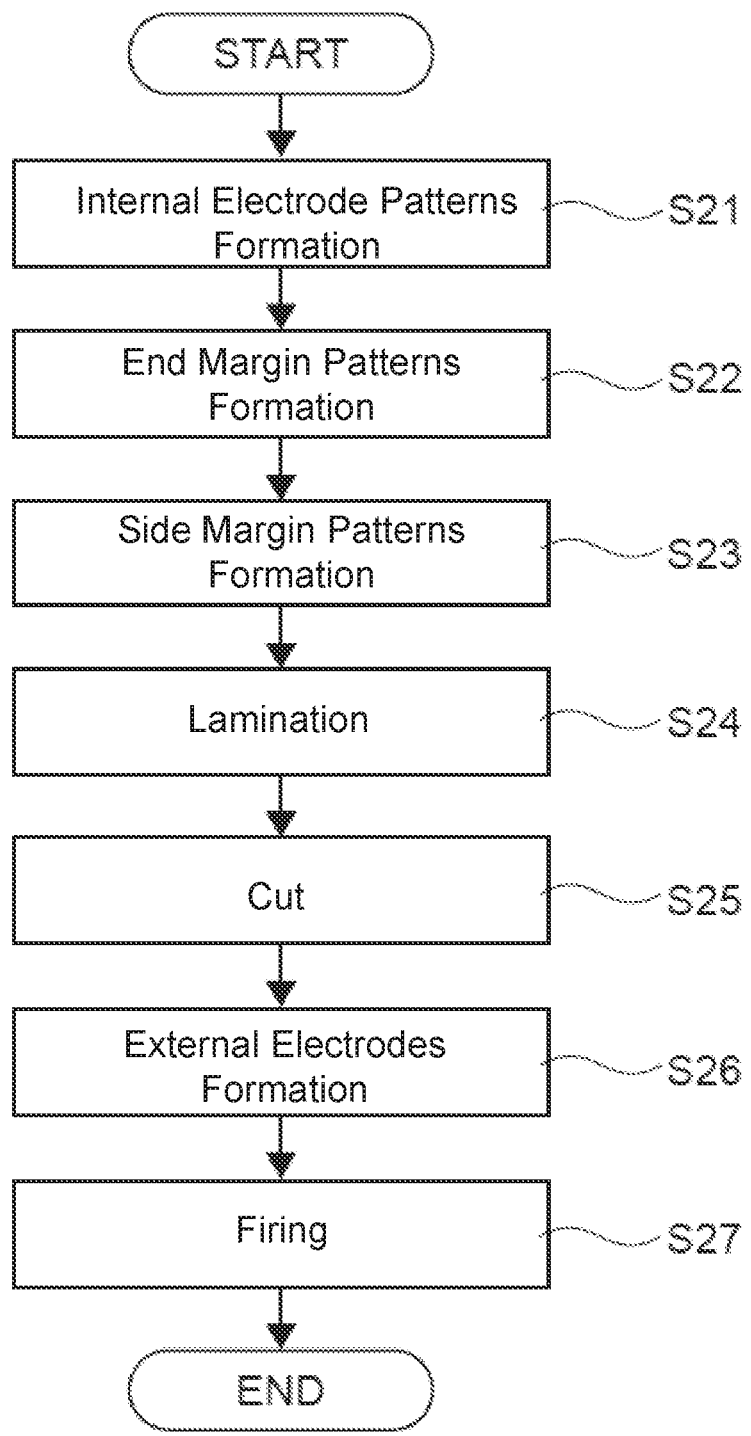
FIG. 16 is a flowchart showing a manufacturing method of the multilayer ceramic capacitor of the second embodiment.

FIG. 16 is a flowchart showing a manufacturing method of the multilayer ceramic capacitor 30. FIGS. 17 to 19B are diagrams schematically showing manufacturing processes of the multilayer ceramic capacitor 30. Hereinafter, a method for manufacturing the multilayer ceramic capacitor 30 will be described along the flowchart of FIG. 16 with reference to FIGS. 17 to 19B.

<2.1 Step S21: Internal Electrode Patterns Formation>

In step S21, internal electrode patterns 212p and 213p are formed on first ceramic sheets 201 and second ceramic sheets 202, respectively, for forming the capacitance forming parts 16 and the end margin parts 18.

Figure 17:
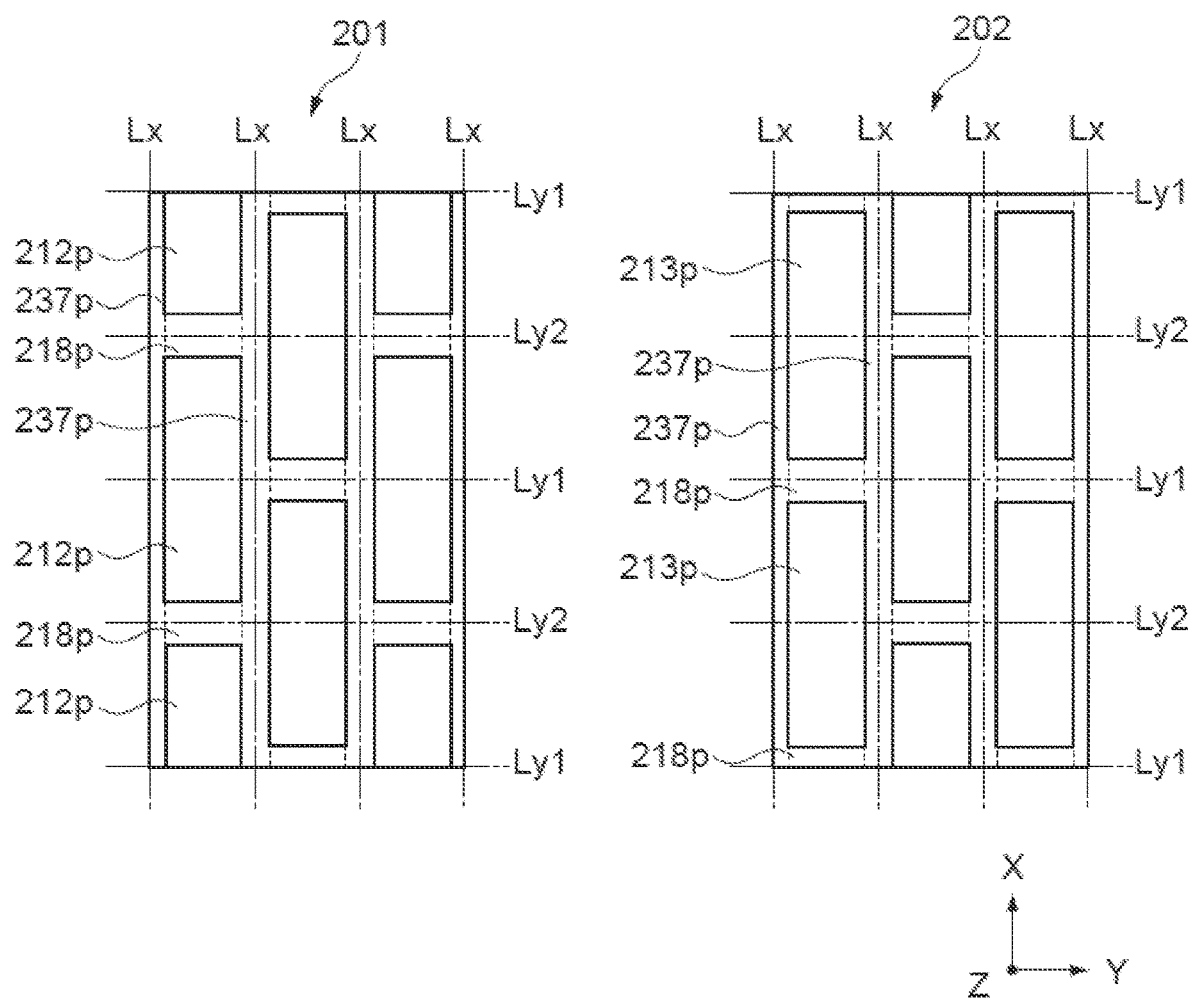
FIG. 17 is a top view showing a manufacturing process of the multilayer ceramic capacitor of the second embodiment.

FIG. 17 is a plan view of the ceramic sheets 201 and 202. At this stage, the ceramic sheets 201 and 202 are configured as large-sized mother sheets that are not yet separated into individual pieces. FIG. 17 shows cutting lines Lx, Ly1 and Ly2 for cutting the sheets into individual multilayer ceramic capacitors 30. The cutting lines Lx are parallel to the X axis, and the cutting lines Ly1 and Ly2 are parallel to the Y axis.

As shown in FIG. 17, unfired first internal electrode patterns 212p corresponding to the first internal electrodes 12 are formed on the first ceramic sheet 201, and unfired second internal electrode patterns 213p corresponding to the second internal electrodes 13 are formed on the second ceramic sheet 202.

Each internal electrode pattern 212p on the first ceramic sheet 201 is formed in a substantially rectangular shape extending in the X-direction across one cutting line Ly1 or Ly2. Each internal electrode pattern 212p is cut along the cutting lines Ly1, Ly2 and Lx to form the first internal electrode 12 of each laminated ceramic capacitor 30.

On the first ceramic sheet 201, the first column in which the internal electrode patterns 212p extending across the cutting line Ly1 are arranged along the X-direction and the second column in which the internal electrode patterns 212p extending across the cutting line Ly2 are arranged along the X-direction are alternately arranged in the Y-direction. In the first column, the internal electrode patterns 212p adjacent to each other in the X-direction face each other with the cutting line Ly2 in between. In the second column, the internal electrode patterns 212p adjacent to each other in the X-direction face each other with the cutting line Ly1 in between. That is, in the first column and the second column adjacent to each other in the Y-direction, the internal electrode patterns 212p are arranged so as to be offset in the X-direction by a dimension of one chip.

The internal electrode patterns 213p on the second ceramic sheet 202 are also configured in the same manner as the internal electrode patterns 212p. However, on the second ceramic sheet 202, the internal electrode patterns 213p of the column corresponding to the first column of the first ceramic sheet 201 extends across the cutting line Ly2, and the internal electrode patterns 213p of the column corresponding to the second column of the first ceramic sheet 201 extends across the cutting line Ly1. That is, the internal electrode patterns 213p are formed so as to be offset from the internal electrode patterns 212p by dimensions of one chip in the X-axis and Y-directions.

<2.2 Step S22: End Margin Patterns Formation>

In step S22, end margin patterns 218p corresponding to the end margin parts 18 are formed in spaces, along the X-axis, between the internal electrode patterns 212p and 213p on the first ceramic sheet 201 and the second ceramic sheet 202.

As shown in FIG. 17, in the present embodiment, the end margin patterns 218p on the first ceramic sheet 201 are formed so as to fill the gaps, on the cutting lines Ly1 and Ly2, between the internal electrode patterns 212p adjacent to each other in the X-direction. As shown in FIG. 17, similarly, the end margin patterns 218p on the second ceramic sheet 202 are formed so as to fill the gaps between the internal electrode patterns 213p adjacent to each other in the X-direction.

The end margin patterns 218p can be formed by applying a ceramic paste to those regions of the ceramic sheets 201, 202 where the electrode patterns are not formed. For the application of the ceramic paste, for example, a screen printing method or a gravure printing method can be used.

The end margin patterns 218p contain a dielectric ceramic such as barium titanate ($BaTiO_3$) as a main component, and contains boron and silicon as subcomponents. Boron and silicon are added in the ceramic paste.

<2.3 Step S23: Side Margin Patterns Formation>

In step S23, side margin patterns 237p corresponding to the side margin parts 37 are formed in spaces, in the Y-direction, between the internal electrode patterns 212p and 213p on the first ceramic sheet 201 and the second ceramic sheet 202.

As shown in FIG. 17, the side margin patterns 237p are each formed in a band-shaped region extending in the X-direction including the cutting lines Lx. That is, as shown in FIG. 17, the side margin patterns 237p on the first ceramic sheet 201 are formed so as to fill the gaps between the internal electrode patterns 212p adjacent in the Y-direction. As shown in FIG. 17, the side margin patterns 237p on the second ceramic sheet 202 are formed so as to fill the gaps between the internal electrode patterns 213p adjacent to each other in the Y-direction.

The side margin patterns 237p can be formed by applying a ceramic paste to those regions of the ceramic sheets 201 and 202 where the electrodes are not formed. For the application of the ceramic paste, for example, a screen printing method or a gravure printing method can be used.

The side margin patterns 237p contain a dielectric ceramic such as barium titanate ($BaTiO_3$) as a main component, and contains boron and silicon as subcomponents. In this embodiment, the side margin patterns 237p contain a lower concentration of boron than the end margin patterns 218p. Further, the side margin patterns 237p may contain silicon having a higher concentration than the end margin patterns 218p. Boron and silicon are added in the ceramic paste.

The order of step S22 and step S23 may be interchanged. That is, step S23 may be performed first, and step S22 may be performed after that.

<2.4 Step S24: Lamination>

Figure 18:
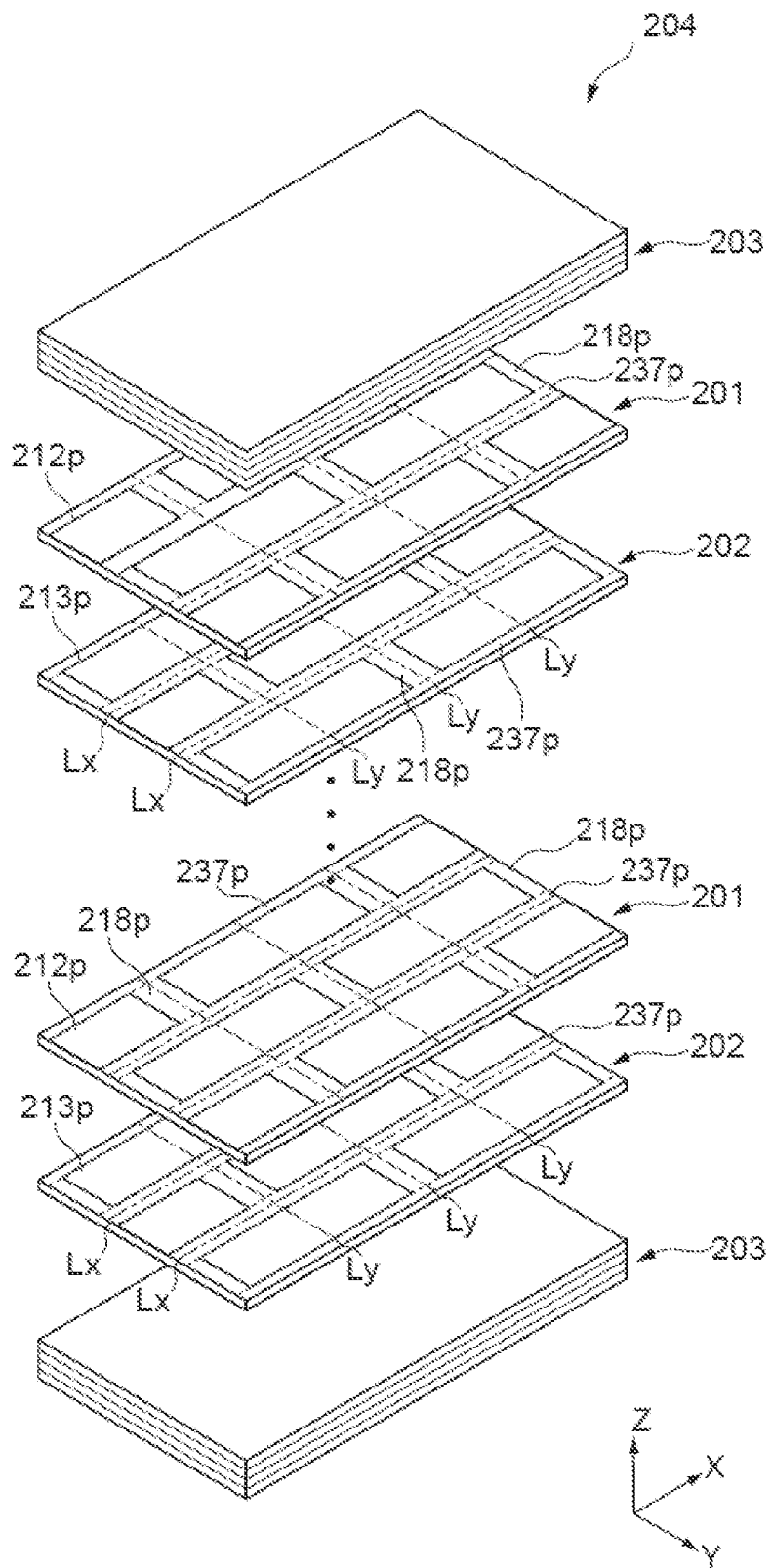
FIG. 18 is a perspective view showing a manufacturing process of the multilayer ceramic capacitor of the second embodiment.

In step S24, laminated sheets 204 are produced by laminating and press-joining the ceramic sheets 201, 202 prepared in steps S21 and S22 and third ceramic sheets 203, as shown in FIG. 18. The number of laminated ceramic sheets 201, 202, and 203 is not limited to the illustrated example.

<2.5 Step S25: Cut>

In step S25, a plurality of unfired ceramic bodies 231 are produced by cutting the laminated sheets 204 obtained in step S24 along the cutting lines Lx, Ly1 and Ly2.

Figure 19A:
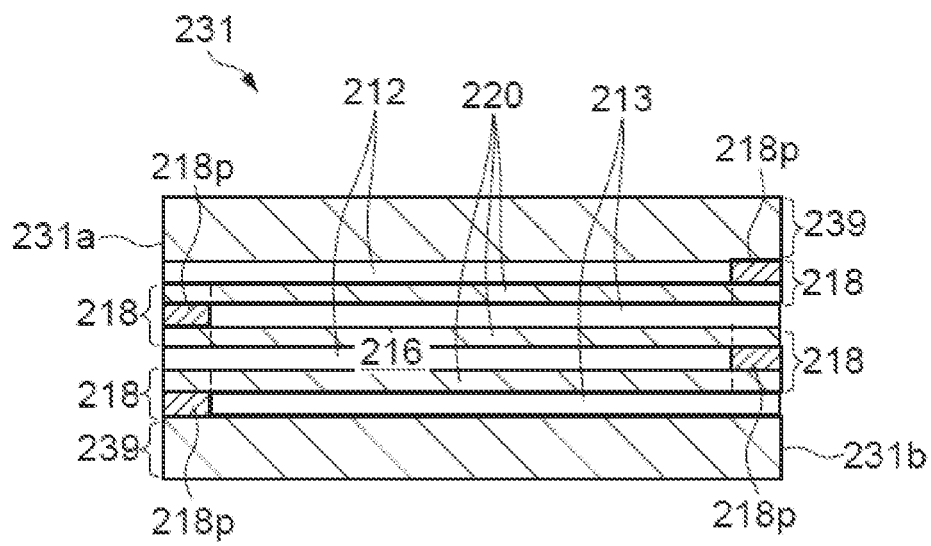
FIGS. 19A-19B are schematic cross-sectional views showing a manufacturing process of the above-mentioned multilayer ceramic capacitor of the second embodiment.
Figure 19A:
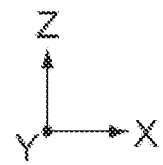
Figure 19B:
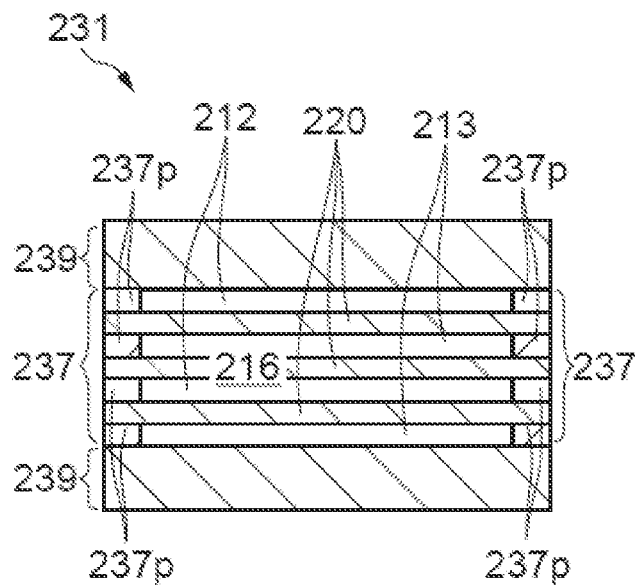
Figure 19B:
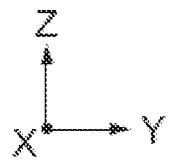

FIGS. 19A and 19B are schematic cross-sectional views of the ceramic body 231. FIG. 19A is a cross-sectional view showing a cross section corresponding to FIG. 9A, and FIG. 19B is a cross-sectional view showing a cross section corresponding to FIG. 9B. In FIGS. 19A and 19B, the number of layers of the internal electrodes 212 and 213 and the ceramic layers 220 is shown to be smaller than that of FIGS. 14 and 15 for the sake of explanation. Further, in FIGS. 19A and 19B, hatching of the internal electrodes 212 and 213 is omitted.

As shown in these figures, the ceramic body 231 includes: a first end surface 231a and a second end surface 231b respectively facing in the negative and positive X-directions; an unfired capacitance forming part 216 in which the internal electrodes 212 and 213 are alternately laminated with ceramic layers 220 interposed therebetween; the unfired end margin parts 218 provided respectively between the first end surface 231a and the second internal electrodes 213 and between the second end surface 231b and the first internal electrodes 212; and unfired side margin parts 237 that cover the capacitance forming part 216 from the positive and negative Y-directions.

As shown in FIG. 19A, the end margin parts 218 are formed by the ceramic layers 220, which are cut from the ceramic sheets 201 and 202, and the end margin patterns 218p. The side margin parts 237 are formed by the ceramic layers 220, which are cut from the ceramic sheets 201 and 202, and the side margin patterns 237p.

The end margin patterns 218p have a higher boron concentration than the ceramic sheets 201, 202 and the side margin patterns 237p, as in the first embodiment. For example, the end margin patterns 218p have a boron concentration of 0.15 atm % or more and 0.30 atm % or less when the concentration of the element at the B site of the ceramic material of the end margin pattern 218p is set to 100 atm %. On the other hand, the ceramic sheets 101 and 102 (ceramic layer 220) and the side margin parts 237 have a boron concentration of less than 0.15 atm % when the concentration of the element at the B site of these ceramic materials is set to 100 atm %.

As a result, the end margin parts 218, composed of the end margin patterns 218p and the ceramic sheets 201 and 202 (ceramic layers 220), as a whole contain a higher concentration of boron than the side margin parts 237 composed of the side margin patterns 237p and the ceramic sheets 201 and 202 (ceramic layers 220).

Further, the side margin patterns 237p may contain silicon. The ceramic sheets 201, 202 (ceramic layers 220) and the end margin patterns 218p may also contain silicon, but for example, the side margin patterns 237p may contain a higher concentration of silicon than the ceramic sheets 201, 202 (ceramic layers 220) and the end margin patterns 218p.

<2.6 Step S26: External Electrodes Formation>

In step S26, unfired external electrodes 14 and 15 are respectively formed on the end surfaces 231a and 231b of the ceramic body 231 obtained in step S25 in the manner similar to step S16 of the first embodiment.

<2.7 Step S27: Firing>

In step S27, the unfired ceramic body 231 on which the unfired external electrodes 14 and 15 are formed in step S26 is fired to form the ceramic main body 31 of the multilayer ceramic capacitor 30 shown in FIGS. 14 and 15. That is, in step S27, the capacitance forming part 216 becomes the capacitance forming part 16, the side margin parts 237 become the side margin part s37, the end margin parts 218 become the end margin parts 18, and the cover parts 239 become the cover parts 39. The firing can be performed, for example, in a reducing atmosphere or a low oxygen partial pressure atmosphere.

Like the first embodiment, in the present embodiment, the end margin parts 218 contain boron to suppress the relative shrinkage of the external electrodes 14, 15 and the internal electrodes 212, 213 with respect to the shrinkage of the end margin parts 218. As a result, the connection between the first internal electrodes 12 and the first external electrode 14 and the connection between the second internal electrodes 13 and the second external electrode 15 can be secured.

On the other hand, since the side margin parts 237 contain boron having a concentration lower than that of the end margin parts 218, excessive grain growth of the ceramic grains is suppressed, and the fine structures of the internal electrodes 12 and 13 can be maintained. As a result, it is possible to prevent poor insulation between the internal electrodes 12 and 13. Further, since the side margin parts 237 contain silicon, the sintering temperature is lowered by cooperation of silicon and boron. As a result, the side margin parts 37 also shrink in a manner similar to the shrinkage of the internal electrodes 12 and 13, and therefore, structural defects such as cracks between the side margin parts 37 and the capacitance forming part 16 are prevented, and associated insulation failure can be avoided.

III. Third Embodiment

In the second embodiment, both the end margin patterns 218p and the side margin patterns 237p are formed in steps S22 and S23 of the method for manufacturing the multilayer ceramic capacitor 30. In contrast, as will be explained below, in a third embodiment below, only the end margin patterns 218p are formed without forming the side margin patterns.

Figure 20A:
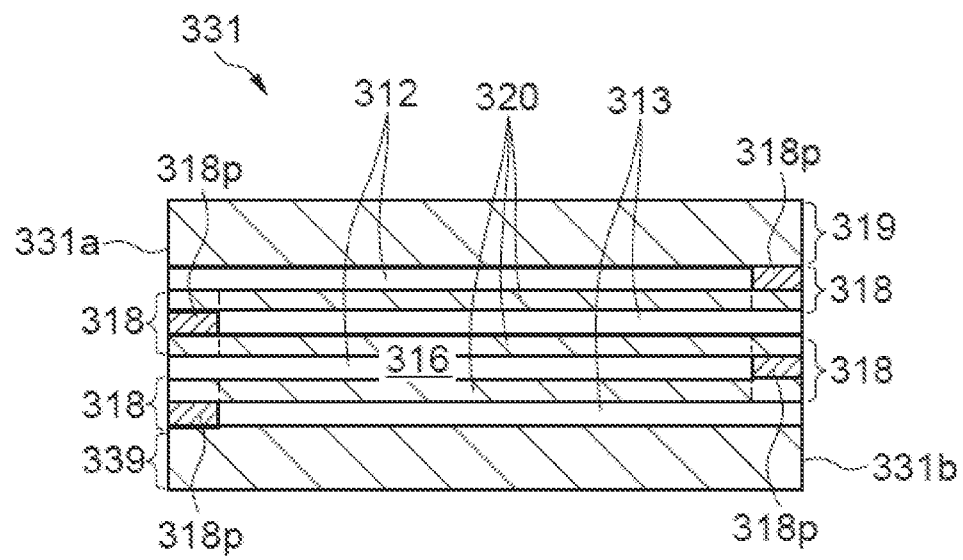
FIGS. 20A-20B are schematic cross-sectional views showing a manufacturing process of a multilayer ceramic capacitor according to a third embodiment of this disclosure.
Figure 20B:
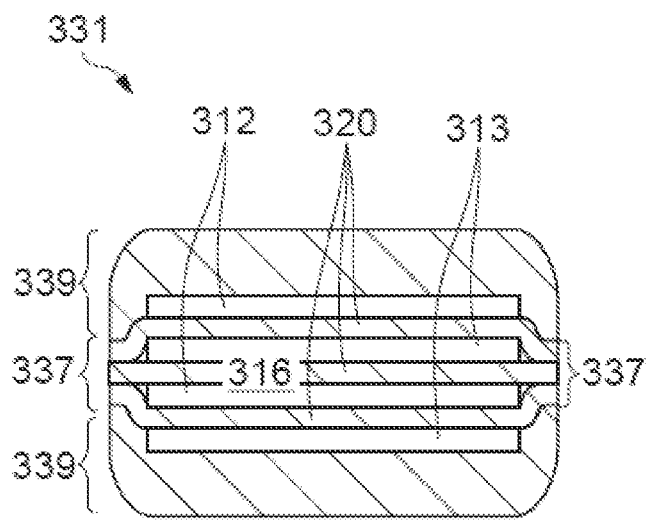

FIGS. 20A and 20B are schematic cross-sectional views of the unfired ceramic main body 331 of the third embodiment. FIG. 20A is a cross-sectional view showing a cross section corresponding to FIG. 9A, and FIG. 20B is a cross-sectional view showing a cross section corresponding to FIG. 9B. In FIGS. 20A and 20B, the number of layers of the internal electrodes 312 and 313 and the ceramic layers 320 is shown to be smaller than that of FIGS. 14 and 15 for the sake of explanation. Further, in FIGS. 20A and 20B, hatching of the internal electrodes 312 and 313 is omitted.

As shown in these figures, the ceramic main body 331 includes: a first end surface 331a and a second end surface 331b respectively facing in the negative and positive X-directions; an unfired capacitance forming part 316 in which the internal electrodes 312 and 313 are alternately laminated with the ceramic layers 320 sandwiched between them; unfired end margin parts 318 provided respectively between the first end surface 331a and the second internal electrodes 313 and between the second end surface 331b and the first internal electrodes 312; unfired side margin parts 337 that respectively cover the capacitance forming part 316 from the positive and negative Y-directions; and unfired cover parts 339 that cover the capacitance forming part 316 from above and below.

As shown in FIG. 20A, the end margin parts 318 are formed by the ceramic layers 320, which are cut from ceramic sheets, and the end margin patterns 318p. In the present embodiment, the side margin parts 337 are formed by the ceramic layers 320, which are cut from the ceramic sheet.

The number of layers of the side margin parts 337 of the present embodiment is smaller than that of the capacitance forming part 316 and the end margin parts 318. Therefore, the side margin parts 337 are pressed along the Z-axis so that the thickness thereof in the Z-direction becomes smaller than that of the capacitance forming part 316 and the end margin parts 318.

The end margin patterns 318p have a higher boron concentration than the ceramic sheets (ceramic layers 320), as in the first embodiment. As a result, the end margin parts 318 composed of the end margin patterns 318p and the ceramic layers 320 contain boron having a higher concentration as a whole than the side margin parts 337 composed of only the ceramic layers 320.

Further, the ceramic sheets (ceramic layer 320) may contain silicon. The end margin patterns 318p may also contain silicon, but for example, the ceramic sheets (ceramic layers 320) may contain a higher concentration of silicon than the end margin patterns 318p. As a result, the side margin parts 337 as a whole may contain a higher concentration of silicon than the end margin parts 318 made of the end margin patterns 318p and the ceramic sheets.

Such a ceramic main body 331 is fired after the external electrodes 14 and 15 are formed on the end surfaces 331a and 331b. As a result, a multilayer ceramic capacitor having the configuration similar to that shown in FIGS. 14 and 15 is manufactured.

Like the first embodiment, in the present embodiment as well, the end margin parts 318 contain boron to suppress the relative shrinkage of the external electrodes 14, 15 and the internal electrodes 312, 313 with respect to the shrinkage of the end margin parts 318. As a result, the connection between the first internal electrodes 12 and the first external electrode 14 and the connection between the second internal electrodes 13 and the second external electrode 15 can be secured.

Further, since the side margin parts 337 contain boron having a concentration lower than that of the end margin parts 318, excessive grain growth of the ceramic grains can be suppressed, and the fine structures of the internal electrodes 12 and 13 can be maintained. As a result, it is possible to prevent poor insulation of the internal electrodes 12 and 13. Further, since the side margin parts 337 contain silicon, the sintering temperature is lowered by cooperation of silicon and boron. As a result, the side margin parts 37 also shrink in a manner similar to the shrinkage of the internal electrodes 12 and 13, and structural defects such as cracks between the side margin parts 37 and the capacitance forming part 16 are suppressed, and associated insulation failure can be prevented.

IV. Other Embodiments

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

For example, in each of the above embodiments, the multilayer ceramic capacitors 10 and 30 have been described as an example of the laminated ceramic electronic component, but the present disclosure is applicable to all the types of laminated or multilayer ceramic electronic components having a pair of external electrodes. Examples of such multilayer ceramic electronic components include chip varistors, chip thermistors, and multilayer inductors.

What is claimed is:

1. A multilayer ceramic electronic component, comprising:
    a ceramic main body having a first end surface and a second end surface respectively facing in a first direction and in a direction opposite to the first direction, the ceramic main body including: a functional part in which first internal electrodes, which are drawn out to the first end surface, and second internal electrodes, which are drawn out to the second end surface, are laminated in a second direction perpendicular to the first direction with ceramic layers interposed therebetween; end margin parts provided respectively between the first end surface and the second internal electrodes and between the second end surface and the first internal electrodes; and side margin parts that respectively cover the functional part from a third direction perpendicular to the first and second directions and from a direction opposite to the third direction; and
    external electrodes respectively provided on the first end surface and the second end surface,
    wherein the end margin parts contain boron (B),
    wherein the side margin parts contain silicon (Si) and boron, a concentration of boron in the side margin parts being less than a concentration of boron in the end margin parts,
    wherein the end margin parts include, as a main component, a ceramic material having a perovskite structure represented by general formula $ABO_3$ as a main phase, and
    wherein when a concentration of an element at B site of the ceramic material in the end margin parts is set to 100 atm %, a boron concentration in the end margin parts is 0.015 atm % or more and 0.025 atm % or less.

2. The multilayer ceramic electronic component according to claim 1,
    wherein the end margin parts further contain silicon (Si), and
    wherein a concentration of silicon in the side margin parts is greater than a concentration of silicon in the end margin parts.

3. The multilayer ceramic electronic component according to claim 1, wherein a boron concentration in the side margin parts is 70% or less of a boron concentration in the end margin parts.

4. The multilayer ceramic electronic component according to claim 1, wherein positions of lateral ends of the first internal electrodes and the second internal electrodes along the third direction are aligned with each other within 0.5 μm in the third direction.

5. A method for manufacturing a multilayer ceramic electronic component, comprising:
    forming an unfired ceramic main body having a first end surface and a second end surface respectively facing in a first direction and in a direction opposite to the first direction, the ceramic main body including: a functional part in which first internal electrodes, which are drawn out to the first end surface, and second internal electrodes, which are drawn out to the second end surface, are laminated in a second direction perpendicular to the first direction with ceramic layers interposed therebetween; end margin parts provided respectively between the first end surface and the second internal electrodes and between the second end surface and the first internal electrodes; and side margin parts that cover the functional part from a third direction perpendicular to the first and second directions and from a direction opposite to the third direction, the end margin parts containing boron (B), and the side margin parts containing silicon (Si) and boron, a concentration of boron in the side margin parts being less a concentration of boron that in the end margin parts;
    forming unfired external electrodes respectively on the end surfaces of the unfired ceramic main body; and
    firing the unfired ceramic main body having the unfired external electrodes formed thereon, thereby forming the multilayer ceramic electronic component,
    wherein in the multilayer ceramic electronic component formed by the firing of the unfired ceramic main body, the end margin parts include, as a main component, a ceramic material having a perovskite structure represented by general formula $ABO_3$ as a main phase, and
    wherein in the multilayer ceramic electronic component formed by the firing of the unfired ceramic main body, when a concentration of an element at B site of the ceramic material in the end margin parts is set to 100 atm %, a boron concentration in the end margin parts is 0.015 atm % or more and 0.025 atm % or less.

* * * * *